US012353674B2

(12) United States Patent
Lundskog et al.

(10) Patent No.: US 12,353,674 B2
(45) Date of Patent: Jul. 8, 2025

(54) ARTIFICIAL REALITY FAMILY HISTORY EXPERIENCE

(71) Applicant: Ancestry.com Operations Inc., Lehi, UT (US)

(72) Inventors: Jordan Mark Lundskog, Lehi, UT (US); Matthew Scott Cox, Orem, UT (US); Keld Tony Sperry, Lehi, UT (US); Christopher Scott Withers, Pleasant Grove, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 0 days.

(21) Appl. No.: 18/421,086

(22) Filed: Jan. 24, 2024

(65) Prior Publication Data

US 2024/0264716 A1    Aug. 8, 2024

Related U.S. Application Data

(60) Provisional application No. 63/440,769, filed on Jan. 24, 2023.

(51) Int. Cl.
| | | |
|---|---|---|
| *G06F 3/04815* | (2022.01) | |
| *G06F 3/01* | (2006.01) | |
| *G06F 3/04845* | (2022.01) | |
| *G06F 16/51* | (2019.01) | |
| *G06T 19/00* | (2011.01) | |

(52) U.S. Cl.
CPC .......... *G06F 3/04815* (2013.01); *G06F 3/017* (2013.01); *G06F 3/04845* (2013.01); *G06F 16/51* (2019.01); *G06T 19/006* (2013.01); *G06T 2200/24* (2013.01)

(58) Field of Classification Search
CPC .. G06F 3/04815; G06F 3/017; G06F 3/04845; G06F 16/51; G06F 3/011; G06T 19/006; G06T 2200/24
See application file for complete search history.

(56) References Cited

U.S. PATENT DOCUMENTS

| | | | | | |
|---|---|---|---|---|---|
| 5,467,471 | A | * | 11/1995 | Bader | G06F 16/284 |
| | | | | | 707/E17.037 |
| 6,570,567 | B1 | * | 5/2003 | Eaton | G06T 11/206 |
| | | | | | 345/428 |
| 7,014,101 | B1 | * | 3/2006 | Kennedy | G06Q 99/00 |
| | | | | | 235/487 |
| 7,162,430 | B2 | * | 1/2007 | Misawa | G06Q 30/0207 |
| | | | | | 705/14.1 |

(Continued)

*Primary Examiner* — Benyam Ketema
(74) *Attorney, Agent, or Firm* — Keller Preece PLLC

(57) ABSTRACT

A genealogy system includes a server with memory and processors storing code that instructs the processors to store genealogy data and user profiles, providing a research platform for users. A remote client device, equipped with an image sensor and display, communicates with the server. The client device displays the genealogy research platform, allowing users to select a genealogy item for an artificial reality experience. Upon user command, the client device presents continually updating artificial reality images of an environment, overlaying a digital representation of the selected genealogy item on the artificial reality experience. This system seamlessly integrates genealogical research with artificial reality technology for an immersive user experience.

20 Claims, 21 Drawing Sheets

(56) References Cited

U.S. PATENT DOCUMENTS

| | | | | |
|---|---|---|---|---|
| 7,249,129 | B2* | 7/2007 | Cookson, Jr. | G06F 16/211 707/999.005 |
| 7,463,792 | B2* | 12/2008 | Peterschmidt | G06F 16/48 382/305 |
| 8,095,567 | B2* | 1/2012 | Cookson, Jr. | G06F 16/951 707/797 |
| 8,356,023 | B2* | 1/2013 | Graham | G06F 16/245 707/706 |
| 8,375,286 | B2* | 2/2013 | Allen | G06F 40/134 715/208 |
| 8,452,805 | B2* | 5/2013 | Knutson | G06Q 10/10 707/769 |
| 8,719,304 | B2* | 5/2014 | Golze | G06F 16/211 707/798 |
| 8,855,935 | B2* | 10/2014 | Myres | G16B 20/00 702/19 |
| 9,465,890 | B1* | 10/2016 | Wilson | G06F 16/9038 |
| 9,477,941 | B2* | 10/2016 | Nikolayev | G06Q 10/10 |
| 9,646,013 | B2* | 5/2017 | Swengler | G06F 16/168 |
| 10,431,002 | B2* | 10/2019 | Gordon | G06T 19/003 |
| 10,790,041 | B2* | 9/2020 | Macpherson | G16B 20/00 |
| 11,482,306 | B2* | 10/2022 | Song | G16B 40/20 |
| 12,148,507 | B2* | 11/2024 | Granka | G16B 5/00 |
| 2002/0032687 | A1* | 3/2002 | Huff | G06F 16/958 |
| 2005/0147947 | A1* | 7/2005 | Cookson | G06F 16/20 434/154 |
| 2007/0178500 | A1* | 8/2007 | Martin | G16B 40/30 435/6.17 |
| 2010/0223281 | A1* | 9/2010 | Hon | G16B 40/20 707/769 |
| 2012/0131061 | A1* | 5/2012 | Cookson, Jr. | G06F 16/951 707/E17.087 |
| 2012/0191703 | A1* | 7/2012 | Huff | G06Q 10/063 707/797 |
| 2013/0117377 | A1* | 5/2013 | Miller | H04L 67/02 709/205 |
| 2014/0025308 | A1* | 1/2014 | Jorde | G16B 20/40 702/19 |
| 2014/0278138 | A1* | 9/2014 | Barber | G06F 16/252 702/19 |
| 2019/0066198 | A1* | 2/2019 | Keeler | G06Q 30/0643 |
| 2019/0107935 | A1* | 4/2019 | Spivack | G06Q 30/0277 |
| 2021/0034647 | A1* | 2/2021 | Nguyen | G16B 50/30 |
| 2021/0192765 | A1* | 6/2021 | Anadure | G06F 3/0488 |
| 2021/0201378 | A1* | 7/2021 | Piramuthu | G06N 20/00 |
| 2023/0142630 | A1* | 5/2023 | Brodie | G06V 30/15 382/157 |
| 2023/0252052 | A1* | 8/2023 | Mitchell | G06F 16/285 707/737 |
| 2024/0161178 | A1* | 5/2024 | Skeen | G06T 19/20 |
| 2024/0264716 | A1* | 8/2024 | Lundskog | G06F 16/51 |
| 2024/0346342 | A1* | 10/2024 | Lewis | G06N 3/044 |

* cited by examiner

ARTIFICIAL REALITY FAMILY HISTORY EXPERIENCE

CROSS-REFERENCE TO RELATED APPLICATION

The present application claims the benefit of U.S. Provisional Patent Application No. 63/440,769, filed on Jan. 24, 2023, which is hereby incorporated by reference in its entirety.

FIELD

The disclosed embodiments are related to a genealogy database, and further related to rendering an artificial reality experience for a genealogy item.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

In the landscape of genealogical exploration, conventional platforms have traditionally offered users access to databases housing familial information and profiles. These systems typically involve navigating through genealogy data via web interfaces, confining the user experience to two-dimensional displays. The evolving expectations and desires of users for a more engaging and immersive genealogical journey demand more interactive experience with the end users, particularly for the development of the genealogy system that is rooted in the pursuit of enhancing user engagement and understanding of familial connections.

SUMMARY

Disclosed herein relates to example embodiments that are related to a system including: a genealogy server including memory and one or more processors, the memory configured to store code including instructions, the instructions, when executed by the one or more processors, cause the one or more processors to: store genealogy data and a plurality of user profiles; and provide a genealogy research platform for users to view the genealogy data; and a client device remote from the genealogy server and in communication with the genealogy server, the client device including an image sensor and a display, the client device configured to: display the genealogy research platform that is in communication with the genealogy server; receive a command from a user selecting a genealogy item to launch an artificial reality experience; present, at the display and responsive to the command, continually updating images of an environment in the artificial reality experience; and render a digital representation of the genealogy item in the artificial reality experience, the digital representation of the genealogy item overlaid on the continually updating images of the environment.

In some embodiments, example embodiments are related to a computer-implemented method, including: displaying, at a client device remote from a genealogy server and in communication with the genealogy server, a genealogy research platform that is in communication with the genealogy server, the genealogy server storing genealogy data and a plurality of user profiles; receive a command from a user selecting a genealogy item to launch an artificial reality experience; present, at a display of the client device and responsive to the command, continually updating images of an environment in the artificial reality experience; and render a digital representation of the genealogy item in the artificial reality experience, the digital representation of the genealogy item overlaid on the continually updating images of the environment.

In some embodiments, example embodiments are related to an artificial reality device, including: an image sensor configured to capture an environment; a display configured to display a genealogy research platform that is in communication with a genealogy server that is in communication with the artificial reality device; and a processor configured to execute one or more instructions, the instructions causing the processor to: receive a command from a user selecting a genealogy item to launch an artificial reality experience; cause, responsive to the command, the display to present continually updating images of an environment in the artificial reality experience; and render a digital representation of the genealogy item in the artificial reality experience, the digital representation of the genealogy item overlaid on the continually updating images of the environment.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

While existing genealogy platforms serve as repositories of genealogy data, the disclosed system redefines the user experience by combining data storage capabilities with an interactive artificial reality framework. This strategic integration allows users to move beyond the static confines of traditional genealogical interfaces, providing users with a dynamic and immersive environment for exploring their family history. The genealogy system thus heralds a new era in genealogical research, where technological innovation converges with ancestral exploration, offering users a more profound and enriching connection to their heritage.

In some embodiments, the disclosed embodiments are related to an artificial reality device. The device may include an image sensor configured to capture an environment. The device may also include a display configured to present a genealogy research platform that is in communication with a genealogy server. The artificial reality device is configured to receive a command from a user selecting a genealogy item to launch an artificial reality experience. The display in turn presents continually updating images of an environment in the artificial reality experience and renders a digital representation of the genealogy item in the artificial reality experience. The digital representation of the genealogy item is overlaid on the continually updating images of the environment.

Example System Environment

Figure 1:
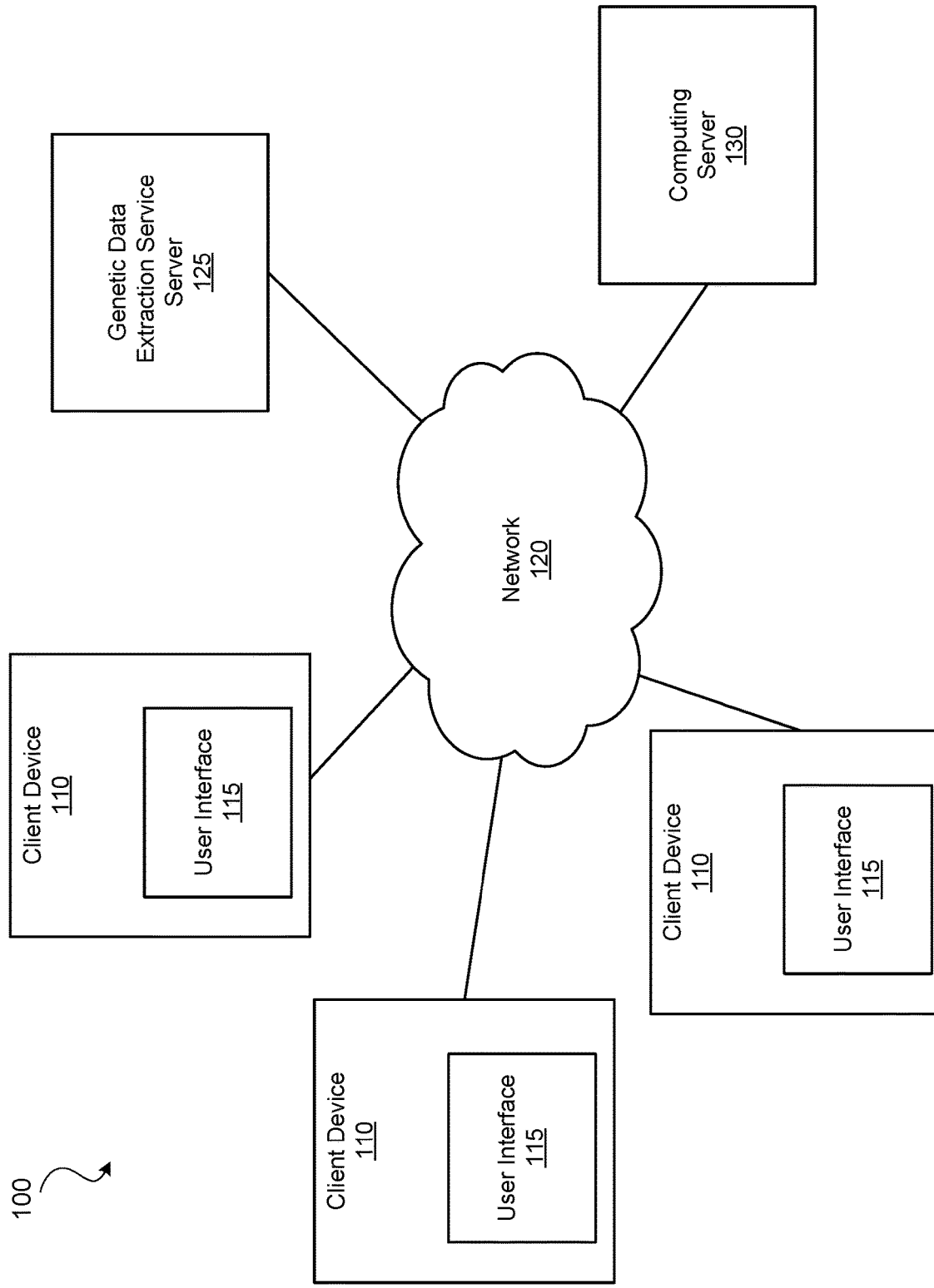
FIG. 1 illustrates a diagram of a system environment of an example computing system, in accordance with some embodiments.

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130.

The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet-switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequences, genotypes, haplotypes, RNA sequences, protein sequences, and phenotypes are examples of biomarkers. In some embodiments, each SNP site may have two readings that are heterozygous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed on the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to the user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
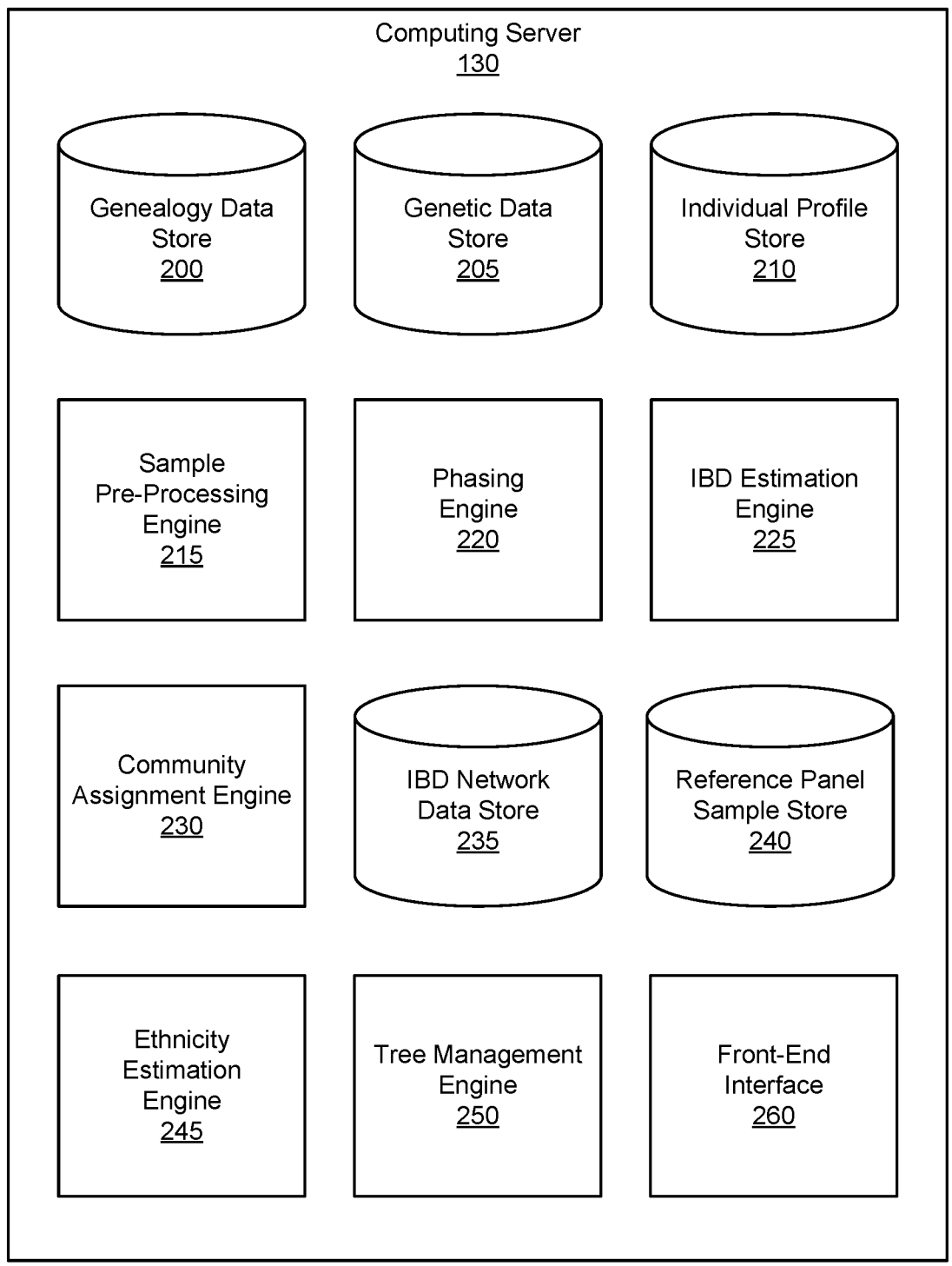
FIG. 2 is a block diagram of an architecture of an example computing system, in accordance with some embodiments.

FIG. 2 is a block diagram of the architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 260, and a tree management engine 250. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections between a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP sites (e.g., allele sites) filtered from the sequencing results. A SNP site that is a single base pair long may also be referred to as a SNP locus. A SNP site may be associated with a unique identifier. The genetic dataset may be in the form of diploid data that includes a sequence of genotypes, such as genotypes at the target SNP site, or the whole base pair sequence that includes genotypes at known SNP sites and other base pair sites that are not commonly associated with known SNPs. The diploid dataset may be referred to as a genotype dataset or a genotype sequence. Genotypes may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to the environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, genetic data, and genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide heightened privacy as a default setting for certain types of data, such as genetic data or any data that the user marks as sensitive. The user may opt into sharing those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

In some embodiments, the individual profile store 210 may be a large-scale data store. In some embodiments, the individual profile store 210 may include at least 10,000 data records in the form of user profiles and each user profile may be associated with one or more genetic datasets and one or more genealogical data entries. In some embodiments, the individual profile store 210 may include at least 50,000 data records in the form of user profiles and each user profile may be associated with one or more genetic datasets and one or more genealogical data entries. In some embodiments, the individual profile store 210 may include at least 100,000 data records in the form of user profiles and each user profile may be associated with one or more genetic datasets and one or more genealogical data entries. In some embodiments, the individual profile store 210 may include at least 500,000 data records in the form of user profiles and each user profile may be associated with one or more genetic datasets and one or more genealogical data entries. In some embodiments, the individual profile store 210 may include at least 1,000,000 data records in the form of user profiles and each user profile may be associated with one or more genetic datasets and one or more genealogical data entries. In some embodiments, the individual profile store 210 may include at least 2,000,000 data records in the form of user profiles and each user profile may be associated with one or more genetic datasets and one or more genealogical data entries. In some embodiments, the individual profile store 210 may include at least 5,000,000 data records in the form of user profiles and each user profile may be associated with one or more genetic datasets and one or more genealogical data entries. In some embodiments, the individual profile store 210 may include at least 10,000,000 data records in the form of user profiles and each user profile may be associated with one or more genetic datasets and one or more genealogical data entries.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from the genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases a diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long genomic distance accuracy and cross-chromosome accuracy in terms of haplotype separation. For example, in some embodiments, an IBD-phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of sub-cluster pairs of first parental groups and second parental groups. Each sub-cluster pair may be in a window. The window may correspond to a genomic segment and has a similar concept of window used in the ethnicity estimation engine 245 and the rest of the disclosure related to HMMs, but how windows are precisely divided and defined may be the same or different in the phasing engine 220 and in an HMM. Each sub-cluster pair may correspond to a genetic locus. In some embodiments, each sub-cluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of sub-cluster pairs). Generating the super-cluster of the parental side may include generating a candidate parental side assignment of parental groups across a set of sub-cluster pairs that represent a set of genetic loci in the plurality of genetic loci. The computing server 130 may determine the number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish who immigrated to America in 1800, Irish who immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is the genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., containing fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors were born at a certain birthplace. The computing server 130 may also draw sequence data from the Human Genome Diversity Project (HGDP). Various candidates may be manually screened based on their family trees, relatives' birth location, and other quality controls. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020, and U.S. Pat. No. 10,692,587, granted on Jun. 23, 2020, entitled "Global Ancestry Determination System" describe different example embodiments of ethnicity estimation.

The tree management engine 250 performs computations and other processes related to users' management of their data trees such as family trees. The tree management engine 250 may allow a user to build a data tree from scratch or to link the user to existing data trees. In some embodiments, the tree management engine 250 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of automatic tree matching, the tree management engine 250 may receive a genetic dataset from the target individual as input and search related individuals that are IBD-related to the target individual. The tree management engine 250 may identify common ancestors. Each common ancestor may be common to the target individual and one of the related individuals. The tree management engine 250 may in turn output potential family trees to which the target individual may belong by retrieving family trees that include a common ancestor and an individual who is IBD-related to the target individual. The tree management engine 250 may further identify one or more probable positions in one of the potential family trees based on information associated with matched genetic data between the target individual and those in the potential family trees through one or more machine learning models or other heuristic algorithms. For example, the tree management engine 250 may try putting the target individual in various possible locations in the family tree and determine the highest probability position(s) based on the genetic dataset of the target individual and genetic datasets available for others in the family tree and based on genealogy data available to the tree management engine 250. The tree management engine 250 may provide one or more family trees from which the target individual may select. For a suggested family tree, the tree management engine 250 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 250 may automatically search, rank, and suggest individuals for the user to conduct manual reviews as the user makes progress in the front-end interface 260 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

The front-end interface 260 may render a front-end platform that displays various results determined by the computing server 130. The platform may take the form of a genealogy research and family tree building platform and/or a personal DNA data analysis platform. The platform may also serve as a social networking system that allows users to connect and build family trees and research family relations together. The results and data may include the IBD affinity between a user and another individual, the community assignment of the user, the ethnicity estimation of the user, phenotype prediction and evaluation, genealogy data search, family tree and pedigree, relative profile and other information. The front-end interface 260 may allow users to manage their profile and data trees (e.g., family trees). The users may view various public family trees stored in the computing server 130 and search for individuals and their genealogy data via the front-end interface 260. The computing server 130 may suggest or allow the user to manually review and select potentially related individuals (e.g., relatives, ancestors, close family members) to add to the user's data tree. The front-end interface 260 may be a graphical user interface (GUI) that displays various information and graphical elements.

The front-end interface 260 may take different forms. In one case, the front-end interface 260 may be a software application that can be displayed on an electronic device such as a computer or a smartphone. The software application may be developed by the entity controlling the computing server 130 and be downloaded and installed on the client device 110. In another case, the front-end interface 260 may take the form of a webpage interface of the computing server 130 that allows users to access their family tree and genetic analysis results through web browsers. In yet another case, the front-end interface 260 may provide an application program interface (API). In some embodiments, the front-end interface 260 may be rendered as part of the content in an artificial reality device, such as a head-mounted display or a phone camera that is integrated with augmented reality features.

The front-end interface 260 may provide various front-end visualization features. In some embodiments, a family tree viewer may render a family tree built by users and/or managed by the tree management engine 250. The family tree may be displayed in nested nodes and edges connected based on family relationships or genetic matches determined by various genetic data analysis engines discussed in FIG. 2. The family trees may include attached records that are part of records in the genealogy data store 200, including records that are uploaded by users and gallery images. The user may assign a focal person to a family tree and the family tree is displayed with the focus (such as positioning the focal person at the center or relative prominent position of the tree) around the focal person. A user may change the focal person and the family tree may shift accordingly based on the relationships and relative positions of members in the family tree. Each person in the family tree may be associated with historical photos from gallery images, historical genealogy records such as life event records, one or more stories and live events associated with the person, and metadata such as family relationships and other family trees associated with the person. Family trees may be displayed in any suitable arrangement, such as a horizontal view, with ancestors of a focal person (such as a user's node) extending from left to right, a vertical view, with ancestors of the focal person extending from bottom to top, a fan view, with ancestors extending angularly from a focal person defining a center of a substantially fan-shaped or circular chart, or in any other suitable arrangement.

The visualization features provided by the front-end interface 260 may include a gallery feature. The gallery feature may be a record repository that allows a user to view or otherwise experience and/or engage with one or more records stored therewithin. The gallery feature may be an image gallery in some embodiments, with images arranged in a suitable manner, such as according to date associated with the image e.g. via metadata, according to upload date, according to metadata such as user-specified metadata including categories or events, or otherwise as suitable. The gallery may include records from a variety of media, including images, stories in the form of written records or articles, sound recordings, historical documents, or otherwise. A plurality of gallery features may be associated with a profile. A plurality of images from a plurality of different gallery features may be browsed, selected, and concurrently displayed to a user via the artificial reality experience as suitable.

In some embodiments, visualization features provided by the front-end interface 260 may include a map feature. A map may be a geographical map that may take the form of a digital map, a historical physical map, and/or a historical map overlaid on a digital map. A user may select a geographical location and the front-end interface 260 displays relevant genealogical or genetic records associated with the location, such as an ancestor's lifetime events, birth locations of DNA matches, mitigation patterns of ancestors across different locations over time and associated genealogical records, residence maps that provide specific locations of historical persons' events, and historical maps overlaying on a digital map to contextualize ancestors' records and events, such as a historical map image as described in U.S. Patent Application Publication No. 2023/0296398, published Sep. 21, 2021, and which is hereby incorporated in its entirety by reference. The map feature may also provide interactive features to allow users to view historical documents, photographs, and stores associated with the geographical locations. The map feature may also allow users to adjust timeframes, displaying changes in locations and migrations over different periods.

In some embodiments, visualization features provided by the front-end interface 260 may include a story feature that provides multimedia narratives about a person, such as a person's live events and family history. The story feature allows a user to compile various graphical and genealogical elements such as photos, documents, historical records, and personal anecdotes into a timeline to summarize a narrative. The story may be arranged in an appropriate spatial manner such as a linear alignment, e.g. a horizontal timeline or a vertical timeline, that arranges various graphical elements based on the creator's selection.

In various embodiments described herein, the visualization features provided by the front-end interface 260 may be rendered in an artificial reality device. For example, a family tree may be projected onto a physical wall in an augmented reality image captured by a phone camera. In another example, a story of a historical person may be projected as a virtual pop-up object in a virtual reality or augmented reality environment near a tombstone of the historical person. In yet another example, a photo gallery including genealogy records and historical photos of a family may be rendered as a digital artifact that is manipulatable and interactable in a digital virtual reality environment. Further details and examples of artificial reality features are discussed below.

Example Augmented Reality System

Figure 3:
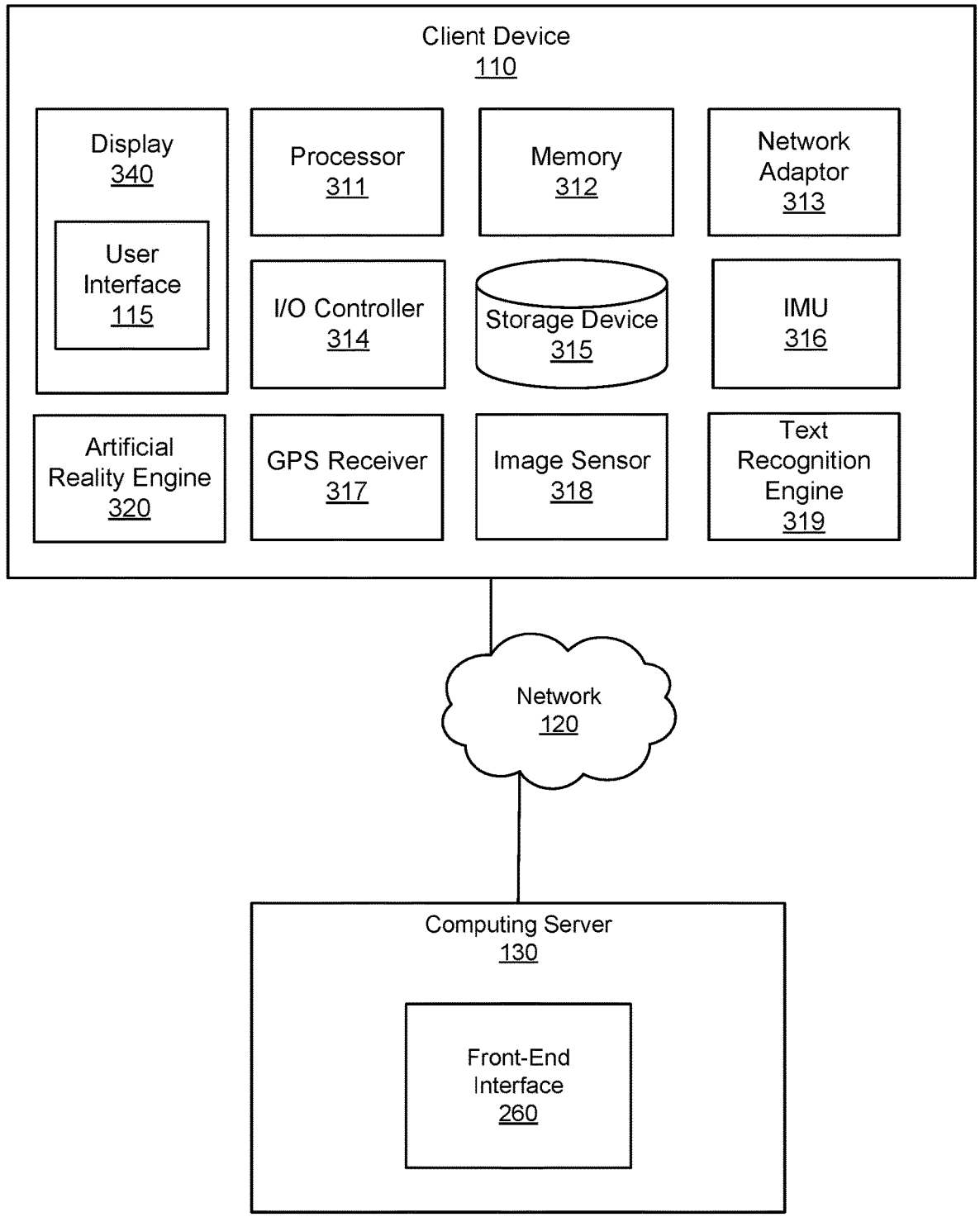
FIG. 3 is a block diagram of an artificial reality system environment in which a client device operates and is in communication with the computing server, in accordance with some embodiments.

FIG. 3 is a block diagram of an artificial reality system environment in which a client device 110 operates and is in communication with the computing server 130, in accordance with some embodiments. The environment includes a client device 110, which may also be referred to as an artificial reality device, a network 120, and a computing server 130, which may be a genealogy server that stores various genealogical data as discussed in FIG. 2. The client device 110 communicates with the computing server 130 through the network 120. The client device 110 can have fewer, different, or additional components than those shown in FIG. 3.

An artificial reality device may be a device that provides any artificial reality feature. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, the client device 110 that provides the artificial reality feature may take various forms. In some embodiments, the client device 110 may take the form of a mobile device (e.g., a smartphone) that includes a camera to capture the real-world environment and that renders digital objects that are superimposed with the real-world environment in an augmented reality setting on a display thereof. In some embodiments, the client device 110 may take the form of a head-mounted display that may or may not include a controller. The head-mounted display may create a virtual reality environment such as a metaverse environment and/or an augmented reality environment that includes the captured surrounding environment. In some embodiments, the client device 110 may take the form of augmented reality glasses that overlay digital information onto the real world, allowing users to interact with virtual elements while being aware of the physical surroundings. In some embodiments, the client device 110 may take the form of a projection-based device that projects content onto surfaces, whether the surface is interactive or not. For example, a surface may be force-sensitive to detect the interactions from the users and may be configured to transmit the detected interactions based on the client device 110. In some embodiments, the client device 110 may take the form of an immersive simulator that is used in a specific setting such as a flight simulator, a driving simulator, or a gaming simulator, to replicate one or more scenarios.

Although FIG. 3 illustrates only a single instance of the components of the system environment, in practice, more than one of each component may be present, and additional or fewer components may be used. For example, there may be more than one user connected to the network 120 through a plurality of client devices 110. Also, even though a single client device 110 is illustrated, the components in FIG. 3 may be distributed into multiple physical devices. For example, the client device 110 may be in fact a system that includes a head-mounted display and a controller. The components described in FIG. 3 may be appropriately distributed among two or more physical devices and some components (e.g., processor) may be presented in both devices.

In some embodiments, the client device 110 includes a processor 311, a memory 312, a network adaptor 313, an input/output (I/O) controller 314, a storage device 315, an inertial measurement unit (IMU) 316, a global positioning system (GPS) receiver 317, an image sensor 318, a text recognition engine 319, an artificial reality engine 320, and a display 340. Fewer, additional, or alternative components may be present in the client device 110 in other embodiments.

The storage device 315 is any non-transitory computer-readable storage medium, such as a hard drive, compact disk read-only memory (CD-ROM), DVD, or a solid-state memory device. The memory 312 holds instructions and data used by the processor 311. The memory 312 includes high-speed random access memory (RAM), such as DRAM, SRAM, DDR RAM, or other random access solid-state memory devices. The I/O controller 314 receives input from a touch input surface (capacitive or otherwise), a keyboard, a microphone, a camera, or another form of input device. The network adaptor 313 couples the client device 110 to the network 120.

The IMU 316 is a data-collecting electronic engine that detects the orientation of the client device 110. The IMU 316 may detect an angular velocity and linear acceleration in up to six degrees of freedom (i.e., x, y, z, yaw, pitch, and roll). The IMU 316 may include one or more accelerometers, one or more gyroscopes, one or more magnetometers, and/or some other sensor that detects movement, of the client device 110, or some combination thereof. The IMU 316 may generate orientation information so that the digital objects may be properly rendered and overlaid with the physical environment.

The GPS receiver 317 is configured to receive information from GPS satellites and calculate the geographical location of the client device 110. The GPS receiver may provide position and velocity data of the client device 110 to the computing server 130. This definition of GPS receiver 317 is expansive and also includes chips or components of long-term evolution (LTE), 3G, 4G, or other similar wireless communications chips, firmware, and software that can provide geographical location information through wireless communication with one or more remote access points rather than by connecting with GPS satellites specifically.

The GPS receiver 317 may provide location information to allow various client devices 110 to share artificial reality experiences. For example, a user may store an artificial reality experience (a family tree and images that are positioned according to the user in an artificial reality setting) and share the experience with another user. The experience may be rendered at the same physical location. The sharing information may include geographical location (geolocation) for other client devices 110 to identify the physical location to re-render the experience. For example, the experience may be a historical story of a deceased person. The sharing information may include a geolocation tag of, e.g., a tombstone of the deceased person. The GPS receiver 317 may use the GPS information to locate the tombstone and render an artificial reality experience of the life story, images, videos, sound recordings, or otherwise of the deceased person at the location of the tombstone.

The image sensor 318 may capture images and/or record video of a surrounding area of the client device 110. An image sensor 318 can be a camera, an infrared sensor, and another sensor. For purposes of this description, the capture of images at a frame rate and the capture of video are effectively synonymous. The captured images/video are presented on the display of the AR system as part of the user interface 115. The video/images are recorded at a sufficient frame rate (e.g., 24 frames per second) so as to provide full-motion video rather than static images. The area captured by the image sensor 318 encompasses an angular range that is a subset of a 360-degree compass direction that depends on the geometry of the lens of the image sensor 318. The images captured by the image sensor 318 may be sent to and stored in the storage device 315.

The image sensor 318 may be used to capture physical surroundings for generating an augmented reality experience and also to detect markers in an environment to detect a sharable artificial reality experience based on the markers. The markers may be distinguishable objects in an environment or encoded markers such as barcodes, QR codes, or other encoded markers. Users may use encoded markers to share artificial reality experiences with other users. The client device 110 may use information captured by the GPS receiver 317 and the image sensor 318 to identify the environment and re-create a sharable artificial reality genealogy experience. For example, a first user may create and position an extensive family tree of a historical celebrity figure and project the digital arrangement of the family tree on the physical wall of a museum. In turn, the physical wall of the museum may carry an encoded marker. Other users may scan the encoded marker and re-project the same family tree of the historical celebrity figure on the museum wall. In some embodiments, users may automatedly access and re-create a sharable artificial reality genealogy experience that is received from a connection as the user device detects that the user is in a location specific to the sharable artificial reality genealogy experience, whereupon the user device generates the artificial reality experience.

The text recognition engine 319 receives an image of text from the image sensor 318. The text recognition engine comprises an optical character recognition (OCR) algorithm. Generally, such algorithms operate according to various mechanisms. For example, they may compare the image to a database of glyphs on a pixel-by-pixel basis, and/or they may also extract features from the text in the image compare the image features with stored glyph features, and choose the closest match. The text recognition engine 319 may provide the text determined from the image of text to the I/O controller 314. Examples of OCR algorithms that may be used include, but are not limited to matrix matching and feature extraction. The text recognition engine 319 may be used to identify textual information relevant to render an artificial reality genealogy experience, such as textual information on a tombstone. Any suitable OCR and other text- or character-recognition modalities may be utilized for interpreting image-sensor-received text, including U.S. Pat. No. 9,619,702, granted Apr. 11, 2017, U.S. Pat. No. 11,551,034, granted Jan. 10, 2023, U.S. Patent Application Publication No. 2022/0138453, published May 5, 2022, U.S. Patent Application Publication No. 2023/0083000, published Mar. 16, 2023, each of which is hereby incorporated herein in its entirety by reference.

The artificial reality engine 320 may be a software package that assists the client device 110 to render various artificial reality features. For example, the artificial reality engine 320 may be an ARKit framework developed by APPLE or another suitable artificial reality framework or package. The artificial reality engine 320 is configured to allow the client device 110 to execute various processes related to artificial reality rendering, such as sizing the elements appropriately, generating virtual frames around elements, such as images in a virtual photo gallery, interacting with the elements, such as tapping on icons on the map or rescaling an element, or otherwise as suitable. The artificial reality engine 320 may use information from the IMU 316, the GPS receiver 317, the image sensor 318, and other components to properly create an artificial reality experience. In some embodiments, the artificial reality engine 320 may also use the information to re-create a sharable artificial reality experience, such as overlaying the same images and/or family trees at the same physical locations intended by the original creators of the artificial reality experience. Artificial reality experiences may be generated iteratively, with subsequent users adding to previously generated artificial reality experiences such that a sharable artificial reality experience grows and morphs with added exposure and interaction by and between users. For example, at a gravesite for a deceased person with numerous progeny, a family tree for the deceased person may be displayed in an artificial reality environment and may adapt iteratively to grow with the person's progeny and to highlight those descendants who have visited the gravesite, thereby generating a virtual family reunion.

The user interface 115 may be a graphical user interface of an application that is published by computing server 130. For example, the user interface 115 may be a genealogy research interface that allows users to browse genealogy data such as photos, family trees, maps, life story timelines, etc. The application provides an AR feature that allows the user to put the graphical representation of the genealogy data (e.g., an image of a family tree) to the area at which the client device 110 is physically located. The user interface 115 also allows users to capture any artificial reality images rendered. The captured artificial reality images may be automatically stored in a user account space of the computing server 130 associated with a particular user profile. Any of the images or interactions may be saved to a story or profile and/or shared with others. In some embodiments, the AR features and rendering provided by the application may also be integrated with Find a Grave AR functionalities. Find a Grave features are described in U.S. Pat. No. 11,093,746, issued on Aug. 17, 2021, and U.S. Pat. No. 11,751,005, issued on Sep. 5, 2023, both entitled "Providing Grave Information using Augmented Reality," and each of which is incorporated by reference hereto for all purposes. Any visualization features discussed in the front-end interface 260 may be rendered by the user interface 115.

The display 340 is a display assembly such as a monitor, a screen, and a near-eye display that provides visual information for the users. The processor 311 may cause the display 340 to visually present different graphical user interfaces (GUIs) such as the user interface 115. For example, the client device 110 may have various software applications installed. One of the software applications is an artificial reality genealogy research application that is operated by the computing server 130. When a user selects and launches the reality-augmented feature, the processor 311 causes the display 340 to present an interface of the software application. The software application may also activate the image sensor 318 and the user interface 115 is configured to continuously display images that are captured by the image sensor 318 and overlay different graphical elements (e.g., one or more graphical representations of genealogy data) and information on the images in manners that will be discussed in further details below.

The system illustrated in FIG. 3 provides an artificial reality genealogy experience that facilitates artificial reality engagement with genealogy-specific tools. It was surprisingly found that the use artificial reality significantly improves user experience in researching and sharing genealogy information. A user may literally step into an experience that provides one or more such family history tools, including family trees, maps specific to a user's family history, photo galleries specific to a user's ancestors, life stories specific to ancestors, etc. The experience is configured to dynamically adapt to a user as the user steps into the artificial reality experience and interacts with one or more elements thereof. As the client device 110 captures a scene, such as a room or other open space, the viewfinder of the client device 110 is simultaneously configured to display a family history tool, such as a family tree, within the scene. The user may interact with the tool within the scene, e.g., by standing near it, pointing to it and taking a photo with the displayed family history tool, manipulating the tool (e.g., by pushing a button, pushing, pulling, or scaling), or otherwise. In some embodiments, a user in an artificial reality experience that provides a more concrete projection or digital rendering of a historical image, e.g. a representation in three-dimensional reality as opposed to limited to two-dimensional screen-limited displays, improves the emotional experience and connection of the user with the content. In some embodiments, a large family tree that is conventionally infeasible to be displayed meaningfully on a computer screen may be overlaid in a large physical wall in an artificial reality experience, thereby allowing a genealogical researcher to explore the large family tree and derive insights thereto in a manner that would be difficult on the limited space of a screen.

A plurality of tools may be simultaneously displayed and manipulated. The tools may be automatically scaled so as to fit within the captured scenery, e.g., on a wall of the room being captured by the image capture device. The artificial reality system allows users to create a bespoke family history experience, facilitating more meaningful engagement with different family history tools and synergistic insights and experiences with combinations of family history tools. Timelines of family history events and facts, family trees, maps showing events in person(s) lives with icons corresponding to particular events, and image galleries may be displayed in artificial reality onto or into a scene. Scaling may be dynamically managed by the system, allowing a user to step into the ad-hoc display. For example, at a family reunion, multiple users may step into the ad-hoc display and capture an image together "with" their ancestor(s). Multiple users may be able to display the sharable artificial reality experience concurrently or sequentially in different locations allowing a virtual family reunion from disparate locations.

The client device 110 may be in communication with the computing server 130, which provides various genealogy and family research tools. A user, through the client device 110, may use any family tree and genealogy research tools provided by the computing server 130. The interface of the genealogy platform may include an artificial reality button that allows the user to create an artificial reality experience with an environment, whether an augmented environment or a completely virtual environment. For example, the user may use the family tree viewer or builder provided by the computing server 130 to arrange and view a family tree. In turn, the user may click the artificial reality experience button. The visualization of the family tree or other tool may be draggable as a manipulatable digital object into the artificial reality environment, such as being able to be overlaid on a physical wall that is captured by the camera of the client device 110. In another example, a user may create a historical family picture gallery and use the tool provided by computing server 130 to render the gallery as a digital artifact. The digital artifact may take any suitable digital form such as a digital album that is expandable. The expanded form of the digital album may include the specific spatial arrangement of photos based on the creator in an artificial reality environment. The digital artifact may be shared and/or stored in an artificial reality experience such as a virtual reality environment as a digital object. The artificial reality environment may include a variety of real-world environments, including spaces with numerous walls and surfaces on which to display the genealogy tools. This may, in some embodiments, allow a user to generate a virtual bespoke museum gallery experience, where the user steps through a space whereon different videos, images, written stories, family trees, maps, and other engageable tools are displayed. This advantageously provides an experience with the genealogy resources that is emotionally engaging and memorable for the user and other users who may concurrently or sequentially experience a sharable genealogy experience with the user.

Example Artificial Reality Experience Rendering Process

Figure 4:
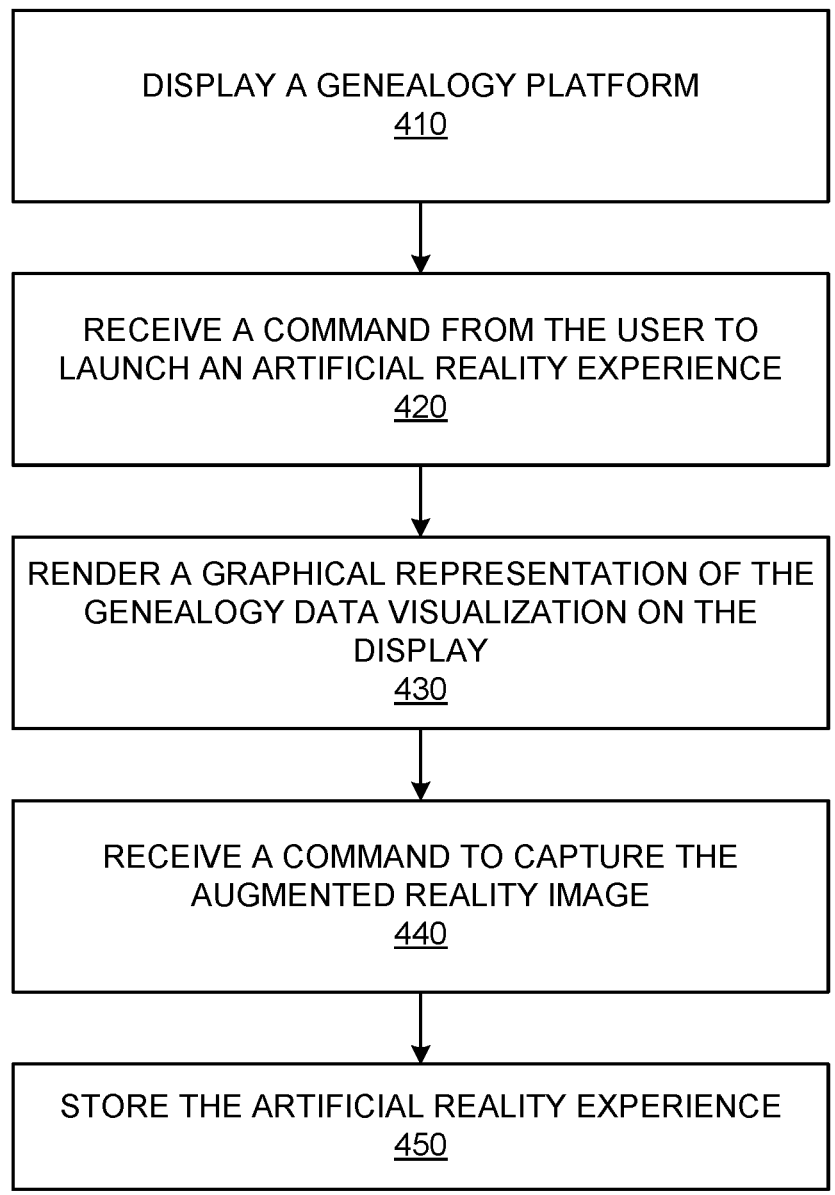
FIG. 4 is a flowchart depicting an example process for rendering an artificial reality experience with genealogy data, in accordance with some embodiments.

FIG. 4 is a flowchart depicting an example process 400 for rendering an artificial reality experience with genealogy data, in accordance with some embodiments. The process 400 may be embodied as a software algorithm that may be stored as computer instructions that are executable by one or more processors. The instructions, when executed by the processors, cause the processors to perform various steps in the process 400. In various embodiments, the process may include additional, fewer, or different steps. The process 400 may be performed by a client device 110 that is located remotely from the computing server 130 or by another suitable computing device.

The computing server 130 may store genealogy data and a plurality of user profiles in a database associated with the computing server. The computing server 130 may maintain a user account space associated with a particular user profile. The user account space allows the user to store user-related data, such as family trees, photos that are uploaded by the user, and any artificial reality images captured by the user using the process 400.

In some embodiments, the process 400 can include causing to display, at the display 340 of a client device 110, a genealogy platform (step 410) that allows users to access various genealogy tools provided by the computing server 130. The tools are discussed in various engines associated with FIG. 2. The genealogy platform may take the form, in some embodiments, of a mobile or desktop application whereon users may access family trees, records, DNA data, etc. The results generated by the computing server 130 may be rendered by different visualization features as discussed for the front-end interface 260. The client device 110 may receive, from a genealogy server such as the computing server 130, the genealogy data selected by the user. The genealogy data may be related to any family history tools, family trees, maps specific to a user's family history, photo galleries, such as photos specific to a user's ancestors, life story timeline, etc. For example, the client device 110 may display a collection of family trees and provide for selection by a user a particular one for rendering. The client device 110 may also receive a selection of a focal person for the family tree. The focal person may be a particular ancestor that the user is interested in researching or learning more about, or may be the user in some embodiments. The client device 110 may receive additional selections by the user, such as the positioning of the family members in the tree, selection or expansion of one or more images and genealogical records that are associated with a member in the family tree, and expansion of one or more branches in the family tree. In some embodiments, the client device 110 may also cause the display to present other visualization features that are discussed for the front-end interface 260, such as launching a story series and a map feature provided by the computing server 130.

In some embodiments, the platform displayed by the client device 110 may include a control element to launch an artificial reality experience during the user's browsing or use of a genealogy tool. The control element may be a launch button of an artificial reality experience and may be available at any point during the user's use of the genealogy tool. For example, the user may be browsing a family tree and the control element allows the user to integrate the family tree in an artificial reality experience. In another example, the user may be viewing a storyline of an individual profile. The control element allows a digital rendering of the storyline to be grouped as a digital object that can be moved and integrated into an artificial reality experience. In yet another example, the user may be viewing a map that includes various details related to certain genealogy events and/or DNA matches. The control element allows the digital rendering of the map to be overlaid with an object in an artificial reality experience.

Continuing with reference to FIG. 4, in some embodiments, process 400 can include receiving a command from the user, such as through the control element of the platform rendered in the display 340 of the client device 110, to launch an artificial reality experience (step 420). The launch of an artificial reality experience may cause an activation of a camera that captures the physical environment of the user and/or a display that renders a digital environment such as a completely digital metaverse environment. For example, the client device 110 may present, at display 340, continually updating images of an area (e.g., a physical scene) captured by one or more image sensors 318 of the client device 110. For example, the images may be continually updated as the user moves the client device 110. The physical environment is continually captured by the image sensors 318. The client device 110 may be a phone that captures the environment as the user directs the camera at various angles or the client device 110 may be a head-mounted display that renders the environment as the user turns to different angles.

Continuing with reference to FIG. 4, in some embodiments, process 400 can include rendering a graphical representation of the genealogy data visualization on display 340 (step 430). The process of retrieving genealogy data and rendering the graphical representation may vary depending on the type of genealogy data, such as family tree, historical images, storylines, and maps. The client device 110 renders the graphical representation of the genealogy data visualization as one or more digital objects that are further movable and/or manipulatable. The client device 110 allows the user to choose and fix the position of the graphical representation in the augmented reality environment. For example, the client device 110 renders a family tree as a digital object that can be dragged around in an artificial reality environment. The family tree may be rendered as a single digital object to allow the user to move the tree as a whole. Alternatively, or additionally, one or more components in the family tree, such as a node or an ancillary photo, may be rendered as separate digital objects that can be positioned differently relative to the digital object of the family tree. The digital object may be positioned in an appropriate location in the environment. For example, in an augmented reality environment where the surrounding is captured, a graphical representation of a family tree or a photo may be "fixed" on a physical object such as a physical wall. As such, a user in the artificial reality experience can perceive that the digital family tree is posted on the physical wall.

In some embodiments, the client device 110 may accept various command gestures to allow the user to manipulate the digital representations of the genealogy items (e.g., family tree) relative to the artificial reality environment, such as the physical area. Different types of gestures may control various manipulations of the digital representation, such as dragging, rotating, re-sizing, etc. For example, the client device 110 may present, at the user interface 115 on an application published by the computing server 130, the digital representation of the genealogy data. The client device 110 may receive a gesture command from a user at the graphical user interface. The gesture command indicates a drag action to drag the graphical representation to the continually updating images of an area. The client device 110 may present a continuous movement of the graphical representation in the area until a position of the digital representation is fixed in the artificial reality image. The user may use the touch screen on the client device 110 to drag a family tree around in the physical area captured in the continually updating images before the family tree is fixed at a location. The client device 110 may capture another gesture indicating that the user wants to enlarge the digital representation. In turn, the client device 110 adjusts the size of the digital representation in the artificial reality environment. In some embodiments, the user may adjust the family tree itself, for example by specifying that the tree should show more or fewer generations (vertical expansion and compression, respectively), more or fewer spouses or siblings (lateral expansion and compression, respectively), pivot to a different branch of the family, change an orientation of the family tree, or any other suitable adjustment.

In some embodiments, by adding the digital representation of the genealogy item in an artificial reality environment, the client device 110 may create an artificial reality image or a continually updating series of images. For example, the artificial reality image includes the digital representation of the genealogy item overlaid on continually updating images capturing the area, whether the area is a physical environment or a virtual environment rendered by the client device 110. The digital representation that is presented in the artificial reality image may include a family tree. In some embodiments, the artificial reality image can also include a natural person that is in the area. The natural person may be positioned adjacent to the family tree in the artificial reality image. The family tree may include a node that represents the natural person. As such, the artificial reality image may include the family tree that has the person as part of the family tree and the artificial reality image further includes the actual person. The capturing of the environment may be continually changed based on the angle and/or position of the client device 110. In some embodiments, the digital representation of the genealogy item may be adjusted based on the change in the environment and may be fixed relative to an object in the environment (e.g., fixed on a wall).

Other features may also be included in an artificial reality image, such as various features provided by computing server 130, including but not limited to features provided by IBD estimation engine 225 to identify potential relatives, community assignment engine 230, ethnicity estimation engine 245, tree management engine 250, and the visualization features that can be rendered by the front-end interface 260. For example, the artificial reality image may include a storyline, which provides interactive stories about a user's family likely origin based on the user's unique DNA. Elements of the story include the user's ethnicity estimate, migrations of ancestors were part of, and historical details about the regions on the user's ethnicity estimate. Each of the genealogy items may be rendered as a digital object and is rendered in the artificial reality environment.

Continuing with reference to FIG. 4, in some embodiments, process 400 may include receiving a command to capture an artificial reality image (step 440). For example, the user interface 115 of a client device 110 may resemble a camera application. The user interface 115 may have an image capture button for the user to capture the artificial reality image that includes a digital representation of a genealogy item and a capture of a physical environment. In some embodiments, the capturing of an artificial reality image may serve as a screen capture of a particular moment of the artificial reality experience. The client device 110 may transmit the captured artificial reality image to the computing server 130 for the storage of the captured artificial reality image in the user account space. For example, after the artificial reality image is captured, the artificial reality image may be automatically sent to the computing server 130 and saved in the user account space associated with the user. In some embodiments, a natural person may be captured in the artificial reality environment. As such, the artificial reality image may include a natural person next to a genealogy item such as the person's family tree. This allows end users to make unique family photos that includes the user with personalized genealogy item put together in an image.

Continuing with reference to FIG. 4, in some embodiments, process 400 may include storing the artificial reality experience (step 450). The storage of the artificial reality experience allows the same user to retrieve and re-create the same or similar artificial reality experience in the future. The storage also allows the user to share the artificial reality experience with other users. The storage of the artificial reality experience may include storing the digital representation of the genealogy item, metadata associated with the digital representation, such as positioning data among the digital objects relative to each other, positioning data of the digital objects relative to the environment, size data, orientation data, and versioning data. the storing of the artificial reality experience may also include storing the geolocation data of the physical environment and any physical marker associated with the artificial reality experience. For example, the artificial reality experience may be created to be fixed relative to a physical location such as a particular location at a conference, museum, cemetery, or any suitable venue. The storage of the artificial reality experience may record the geolocation so that other users may recreate the same or similar artificial reality experience at the same physical location. In some embodiments, the artificial reality experience may be additionally identified by a marker such as a QR code or another encoded marker. A client device 110 may use both the marker and the geolocation to recognize the proper physical location to recreate the artificial reality experience. For instance, a family tree may be projected onto a wall at a venue. The wall may be marked with a QR code so that other users may re-create the artificial reality experience. By scanning the QR code, the saved digital representation of the family tree is re-created and projected onto the wall based on the arrangement from the original creator of the artificial reality experience. In other embodiments, the artificial reality experience may be configured to be recreated at a same or similar location and/or orientation relative to a live person identified in the image. For example, if one person poses in the artificial reality experience with a particular element such as a portrait image of a particular ancestor, a relative may pose in the shared artificial reality experience with the same element in a similar orientation.

The artificial reality experience stored by a client device 110 and/or uploaded to the computing server 130 may be shared among other users to re-create the artificial reality experience. By way of example, at a conference, an event creator may create a genealogy artificial reality experience and store the experience. The event creator may install encoded markers or beacons for other users to scan the markers. Upon scanning a marker, a client device 110 may detect the geolocation and/or identifiable object such as a wall on which the marker is placed. In turn, a digital representation of the genealogy item created in the artificial reality experience may be projected to the wall in the re-created artificial reality experience. As such, participants of the conference may enjoy various artificial reality experiences created.

In some embodiments, the retrievable artificial reality experience may also be applied in association with a fixed physical environment object such as a venue or a tombstone. In some embodiment, at a venue that is commonly associated with historical genealogy events, such as a wedding venue, a client device 110 may detect the geolocation and query the computing server 130 for stored artificial reality experiences associated with the venue. For example, a user may have created an artificial reality experience associated with historical marriage records for marriage ceremonies that occurred at a venue. Users browsing the genealogy platform of the computing server 130 may arrive at the venue and look for artificial reality experiences that are available to be re-created at the venue. Similar experienced are envisioned with any suitable historical site, such as immigration points, courthouses, government buildings, battlefields, or otherwise.

In some embodiments, a tombstone may be associated with one or more artificial reality experiences. For example, the deceased person on the tombstone may be associated with a storyline and/or a family tree. A client device 110 may be configured to recognize the tombstone by scanning the text on the tombstone and/or matching the geolocation of the tombstone. In turn, the client device 110 using the platform provided by the computing server 130 may provide an indication to a user that an artificial reality experience is available for the tombstone. The digital data of artificial reality experience may be constantly updated even though the tombstone has been fixed for years. As such, the living data of the deceased may be constantly enriched and be retrievable by users. The digital artifact may serve as a 3D model of a digital heirloom that can be transferred to another user (e.g., another family member) and even passed down in the family as a digital heirloom in the future. The digital artifact may be used as a family history tool.

In some embodiments, the artificial reality experience may take the form of a virtual reality experience where objects are created in a virtual world. The digital representations of genealogy items may be permanently stored in the virtual world. Various users may visit the same virtual locations in the experience. In some embodiments, one or more genealogy items may be stored as digital artifacts and may take different forms. For example, one digital object may be represented as an item such as an album, and may be expanded to an array of genealogy photos that are suspended in the air in response to a user's command for the artifact to be expanded. Other forms of digital representations are also possible.

Artificial Reality Experience Examples

FIG. 5A through FIG. 5F is a series of conceptual diagrams illustrating an example process for creating and launching an artificial reality experience, in accordance with some embodiments. The process illustrated in these figures may be an example of the process 400.

Figure 5A:
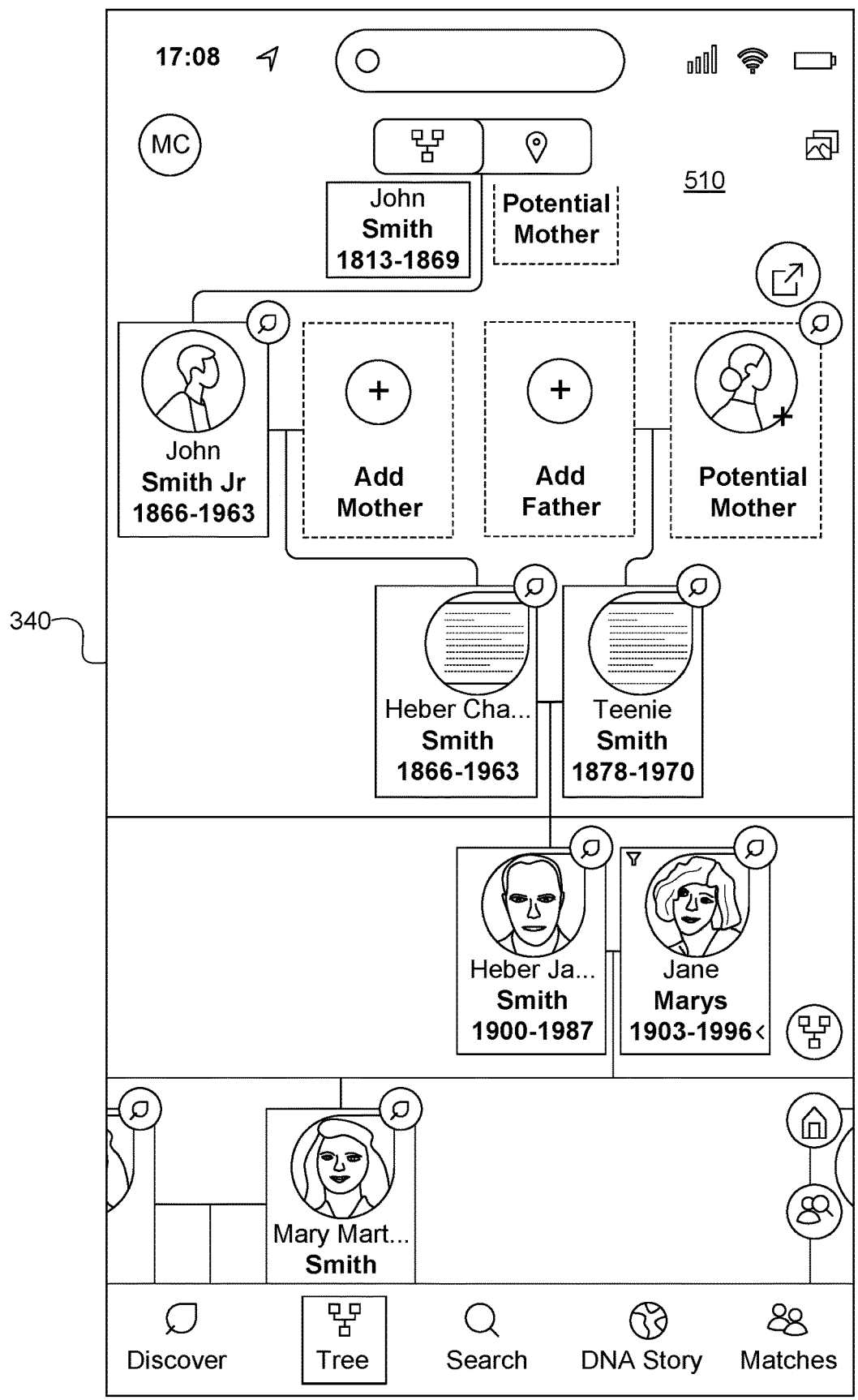
FIG. 5A is a conceptual diagram illustrating a display of the client device presenting a genealogy research software application, in accordance with some embodiments.

FIG. 5A is a conceptual diagram illustrating a display 340 of the client device 110 presenting a genealogy research software application, in accordance with some embodiments. The genealogy research software application 510 may be an example of a platform caused to be displayed by the front-end interface 260 of the computing server 130. The genealogy research software application shows one or more genealogy items such as a family tree to the user. The genealogy research software application may also provide other features that are discussed in FIG. 2.

Figure 5B:
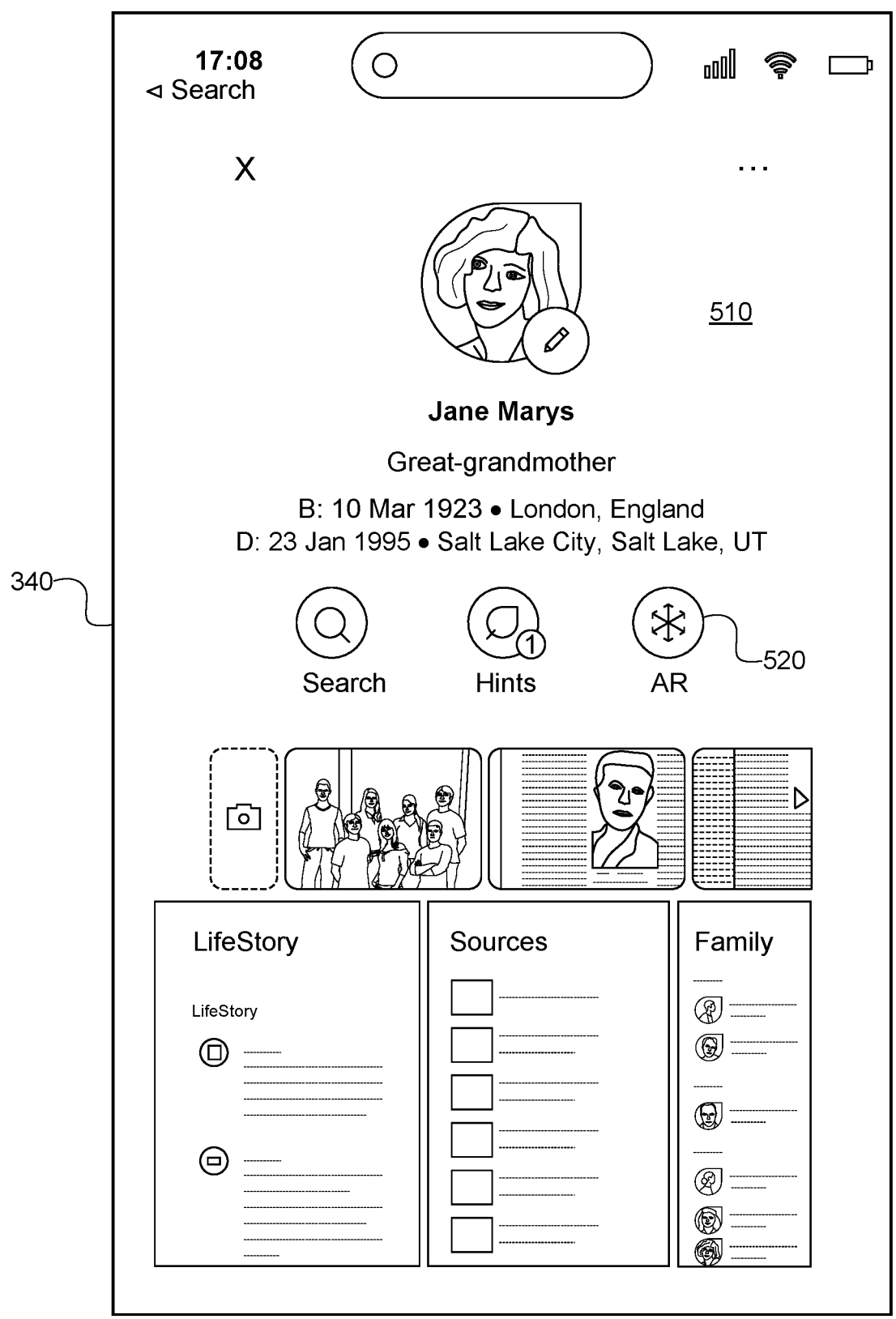
FIG. 5B is a conceptual diagram illustrating a display of the client device presenting a second page of the genealogy research software application displayed at the client device 110, in accordance with some embodiments.

FIG. 5B is a conceptual diagram illustrating a display 340 of the client device 110 presenting a second page of the genealogy research software application 510 displayed at the client device 110, in accordance with some embodiments. The client device 110 may receive a selection of a particular member in the family tree as the focal person. FIG. 5B illustrates the genealogy and profile page of the focal person selected by the user. The page illustrated in FIG. 5B may be displayed in response to a user selecting a person as the focal person from the family tree displayed in FIG. 5A. In some embodiments, the profile page may include various genealogy records and items, such as history, sources, related family members, photos, basic information, and other suitable information about the focal person. The profile page may also include various control elements that allow users to launch additional tools in researching the person. The control elements may include search, hints, and an artificial reality experience launch button 520.

Figure 5C:
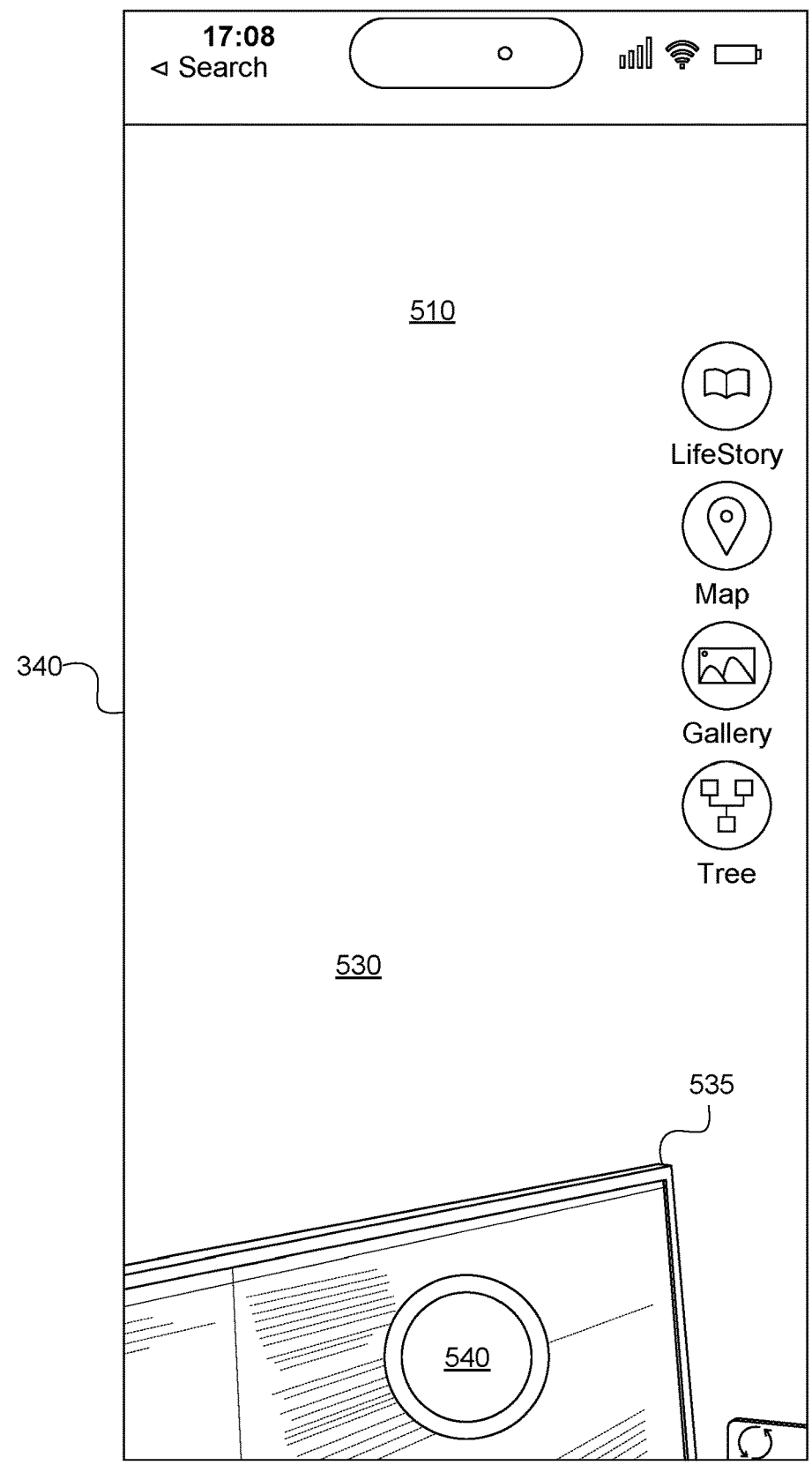
FIG. 5C is a conceptual diagram illustrating a display of the client device presenting the genealogy research software application launching the artificial reality experience, in accordance with some embodiments.

FIG. 5C is a conceptual diagram illustrating a display 340 of the client device 110 presenting the genealogy research software application 510 launching the artificial reality experience in response to the user selecting the activate the experience through the artificial reality experience launch button 520 displayed in FIG. 5B, in accordance with some embodiments. In receiving the command from the user to launch the artificial reality experience, the client device 110 activates one or more image sensors 318 (e.g., a camera or a group of cameras) capturing the physical environment. As illustrated in FIG. 5C, the physical environment currently captured includes a wall 530 and a physical object 535 such as a desktop computer that happens to be captured in the environment. The client device 110 displays the continually updating images of the environment as an image sensor 318 captures the scene. The artificial reality experience is provided as part of the functionality of a genealogy research software application 510. The genealogy research software application 510 may also include an image capture button 540 to capture an artificial reality image. It will be appreciated that in some embodiments the image capture button 540 may be pressed and held to capture a video instead of a single image or may be configured to capture a video by default rather than an image.

Figure 5D:
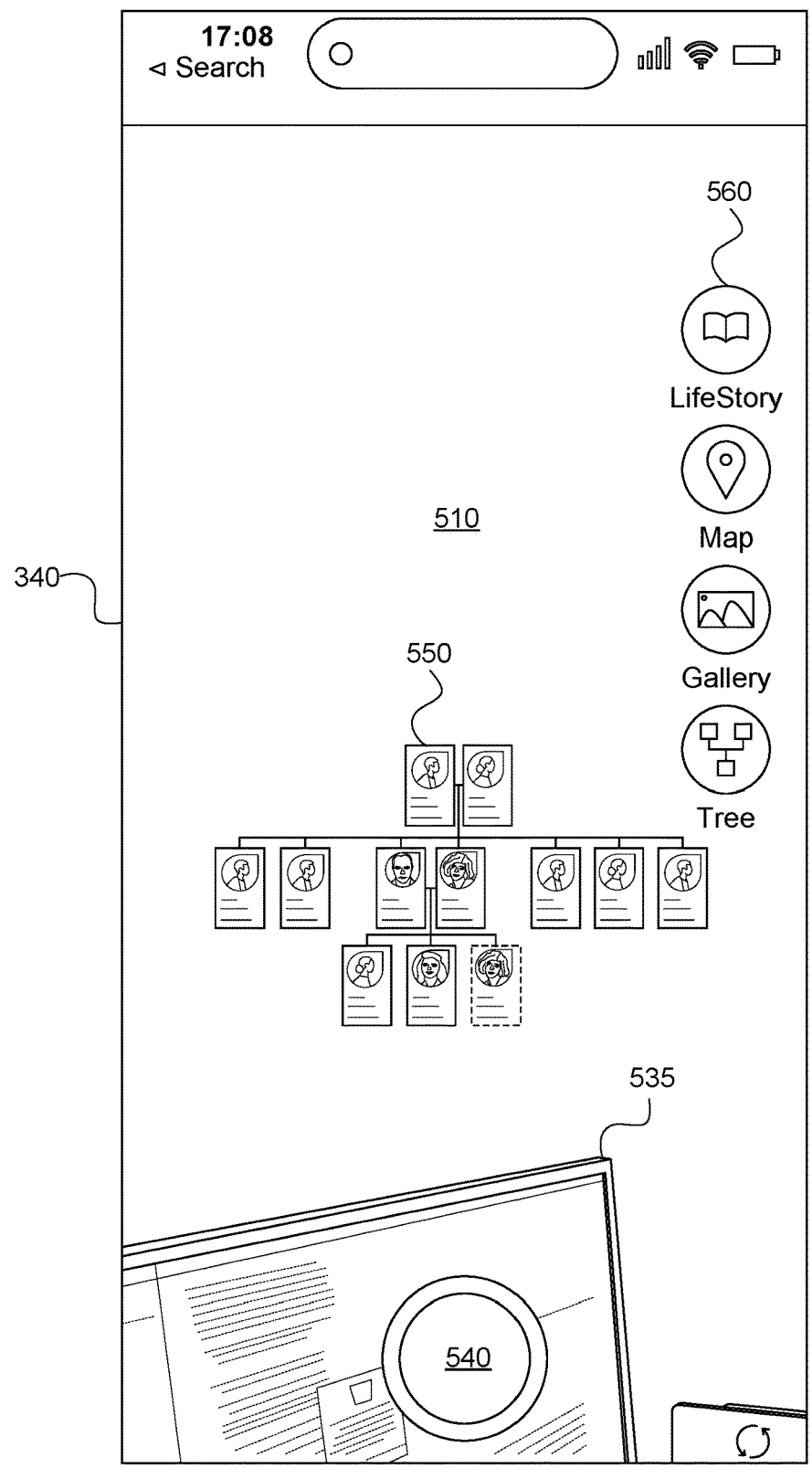
FIG. 5D is a conceptual diagram illustrating a display of the client device presenting an artificial reality experience that overlays a digital representation of a family tree with a captured physical environment, in accordance with some embodiments.

FIG. 5D is a conceptual diagram illustrating a display 340 of the client device 110 presenting an artificial reality experience that overlays a digital representation 550 of a family tree with a captured physical environment, in accordance with some embodiments. FIG. 5D illustrates the artificial reality experience a few moments after an image sensor 318 starts to capture the physical environment, as illustrated in FIG. 5C. In launching the artificial reality experience and activating the image sensor 318, the client device 110 also performs calculations in rendering the digital representation 550 of the family tree with the selected focal person corresponding to the user's selection in FIG. 5B. After the digital representation 550 is ready, the client device 110 displays the family tree as a digital object in the artificial reality experience. The digital object (digital representation 550) may be selected and manipulated, such as moved, re-sized, or rotated, by the user.

The artificial reality experience displayed in FIG. 5C and FIG. 5D is provided as part of the functionality of the genealogy research software application. The functionality of genealogy research software applications may further include adding other genealogy items as digital representations in the artificial reality experience. Those additional genealogy items may be added through control elements 560 that are shown as life story, map, gallery, and tree.

Figure 5E:
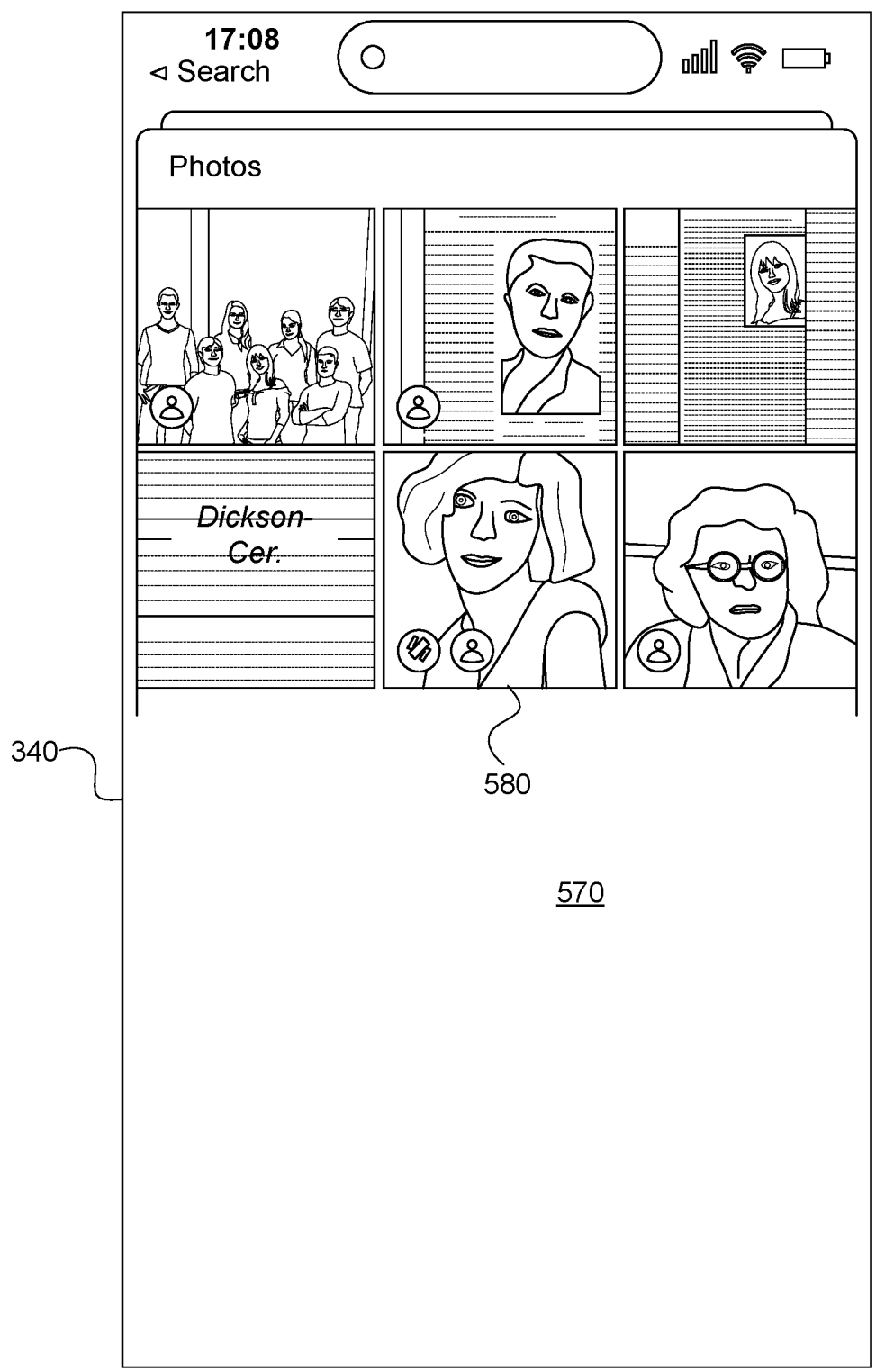
FIG. 5E is a conceptual diagram illustrating a display of the client device presenting a selection page within the artificial reality experience, in accordance with some embodiments.

FIG. 5E is a conceptual diagram illustrating a display 340 of the client device 110 presenting a selection page within the artificial reality experience, in accordance with some embodiments. The selection page may be displayed as a response to the user selecting one of the control elements in the artificial reality experience illustrated in FIG. 5D, such as the "Gallery" button. The client device 110 displays a photo gallery 570, which allows the user to choose a photo 580, for example a photo of the focal person, to be rendered as a digital object to be added to the artificial reality experience.

Figure 5F:
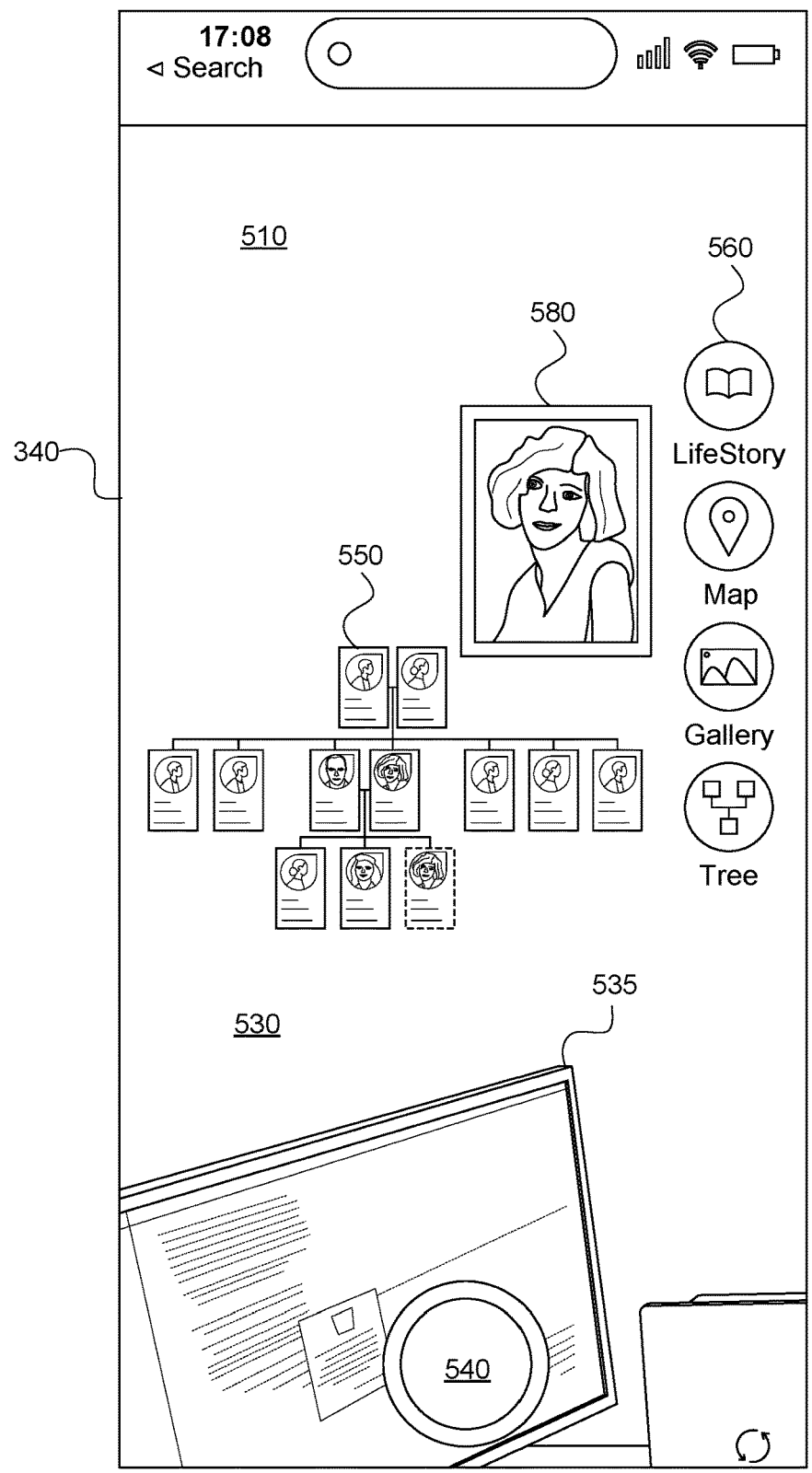
FIG. 5F is a conceptual diagram illustrating a display of the client device presenting the artificial reality experience after the user selects a photo from the photo gallery, in accordance with some embodiments.

FIG. 5F is a conceptual diagram illustrating a display 340 of the client device 110 presenting the artificial reality experience after the user selects a photo 580 from the photo gallery, in accordance with some embodiments. The client device 110 renders the photo 580 as a second digital object and is added to the artificial reality experience with the family tree digital object. The client device 110 allows the user to provide commands to move and re-size the second digital object relative to the family tree digital object. Both digital objects may be moved and fixed relative to the captured physical environment 530. It will be appreciated that a map and/or a LifeStory component may additionally or alternatively be selected by the user and added to the artificial reality experience shown in FIG. 5F.

Figure 6A:
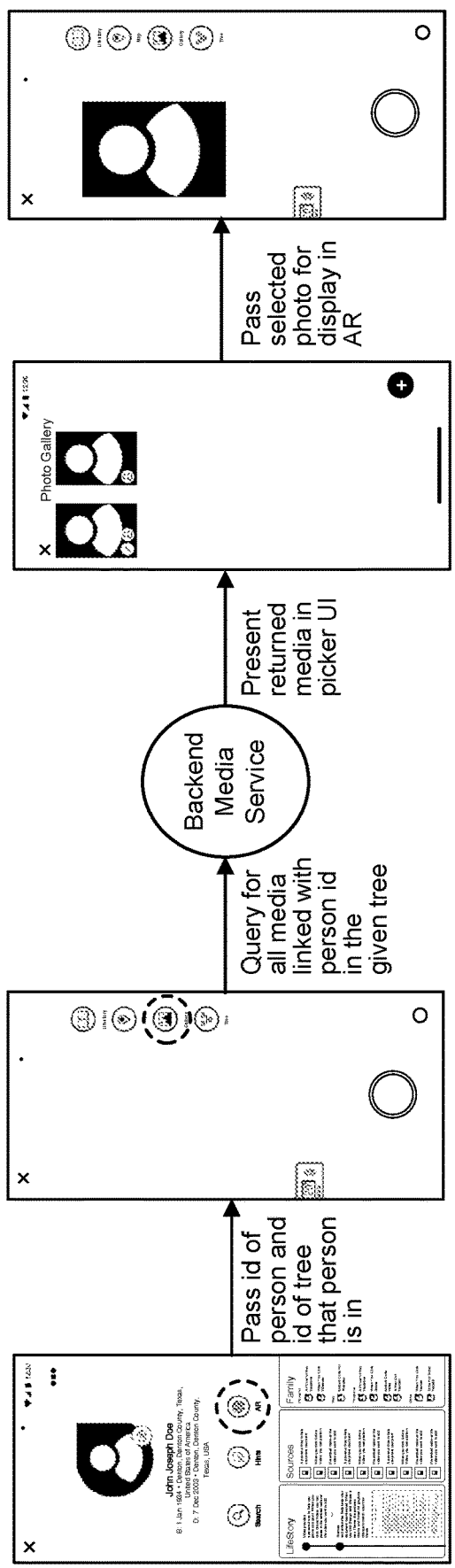
FIG. 6A is a conceptual diagram illustrating a process of using an image as the genealogy item that is rendered in an artificial reality experience, in accordance with some embodiments.

FIG. 6A is a conceptual diagram illustrating a process of using a genealogy item to render an artificial reality experience, in accordance with some embodiments. The process may start with a user interface 115 that is currently displaying a genealogy research page. The user may select an artificial reality mode. In turn, the client device 110 queries the identifier of the person and searches for family trees that the person is in. The query may be sent to the backend media service provided the computing server 130. For example, the backend media service can be any services or a combination of service rendered by various engines described in FIG. 2. In some embodiments, the backend media service can be a tree data service provided by the tree management service 250. The computing server 130 returns media in the user interface 115. The user may select one or more photos to be placed in the artificial reality environment.

Figure 6B:
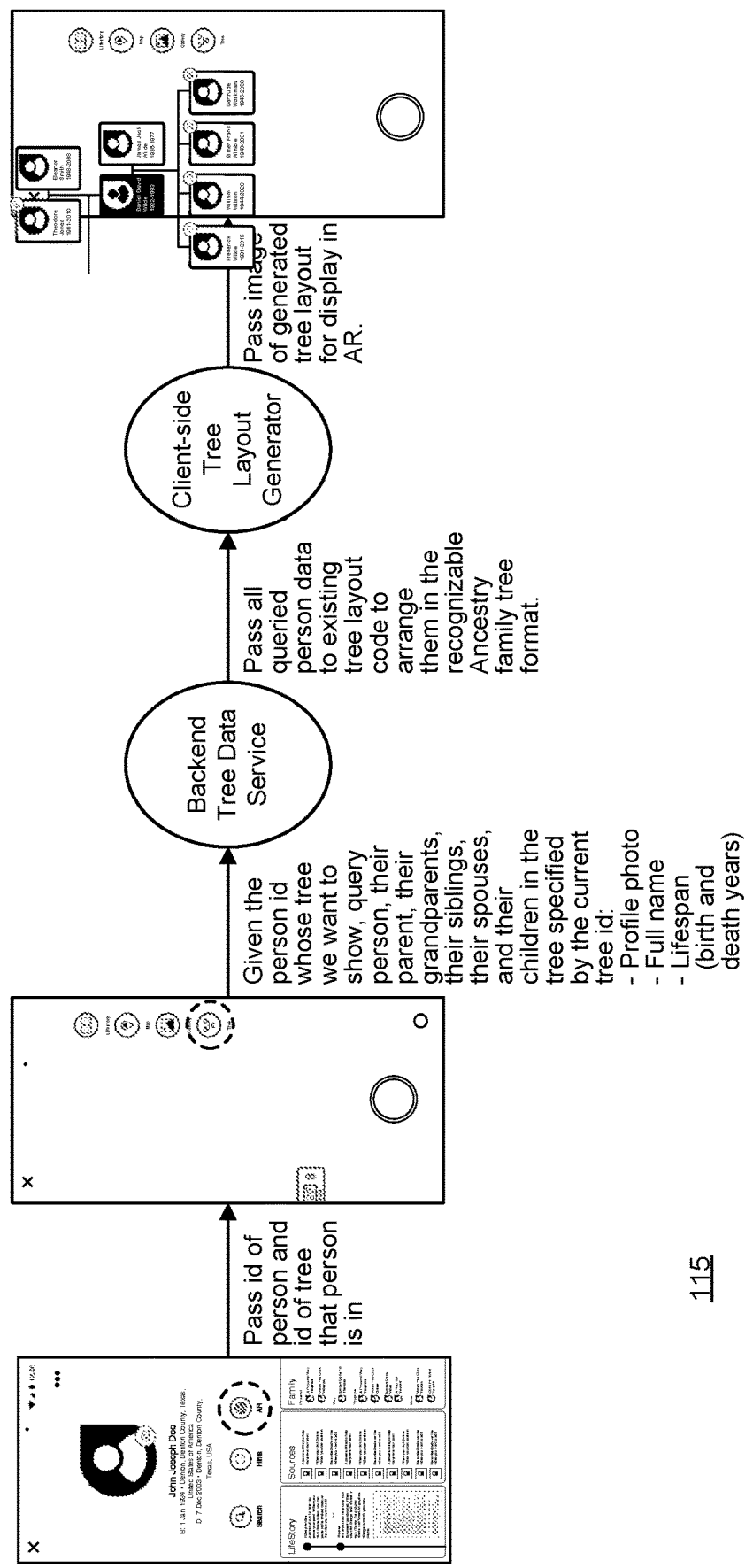
FIG. 6B is a conceptual diagram illustrating a process of using a family tree as the genealogy item that is rendered in an artificial reality experience, in accordance with some embodiments.

FIG. 6B is a conceptual diagram illustrating a process of using a family tree as the genealogy item that is rendered in an artificial reality experience, in accordance with some embodiments. The process may start with a user interface 115 that is currently displaying a genealogy research page. The user may select an artificial reality mode. In turn, the client device 110 queries the identifier of the person and searches for family trees that the person is in. To identify family trees corresponding to a person, the computing server 130 may utilize, in some embodiments, a cluster database such as the cluster database described in U.S. Pat. No. 11,347,798, granted May 31, 2022, U.S. Pat. No. 11,321,361, granted May 3, 2022, U.S. Patent Application Publication No. 2021/0319003, published Oct. 14, 2021, each of which is hereby incorporated by reference in its entirety. The query may also include profile photos, full name, lifespan, relatives, and other relevant information. The query may be sent to the backend media service of the computing server 130. A tree layout generator may be stored in the client device 110. The computing server 130 may provide the data in the family tree as a payload to the client device 110. The tree layout generator in turn renders the graphical representation of the family tree. The graphical representation is then added to the artificial reality environment.

Figure 6C:
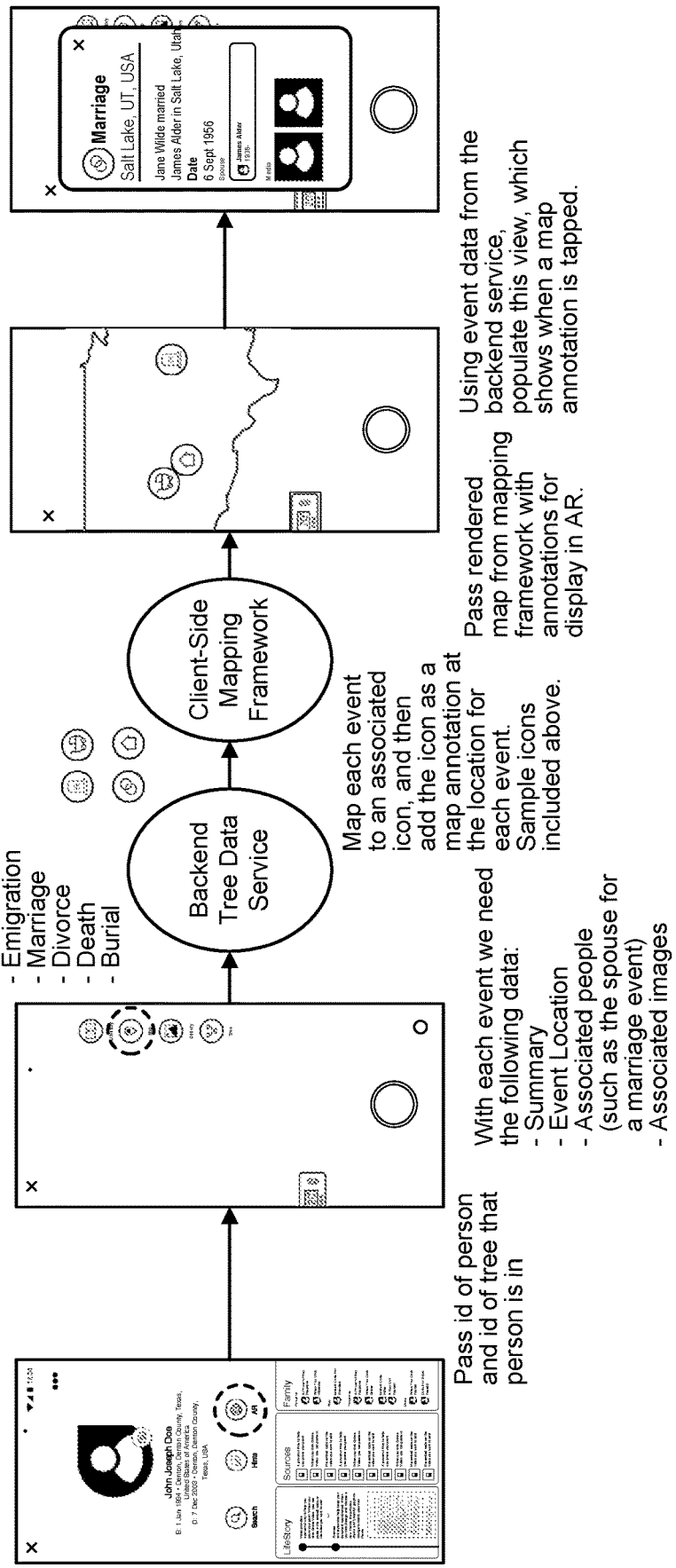
FIG. 6C is a conceptual diagram illustrating a process of using a map as the genealogy item that is rendered in an artificial reality experience, in accordance with some embodiments.

FIG. 6C is a conceptual diagram illustrating a process of using a map as the genealogy item that is rendered in an artificial reality experience, in accordance with some embodiments. The process may start with a user interface 115 that is currently displaying a genealogy research page. The user may select an artificial reality mode. In turn, the client device 110 queries the identifier of the person and searches for a relevant map. The client device 110 may also query for events associated with the person. Events may include birth, residence, religious ceremonies, emigration, marriage, divorce, death, burial, etc. For each event, the client device 110 may query for the summary, event location, event date, associated people (e.g., spouse for a marriage event), and associated images. The query may be sent to the backend media service of the computing server 130. A map generator may be stored in the client device 110. The computing server 130 may provide the data in the map and relevant events as a payload to the client device 110. The map generator in turn renders the graphical representation of the map with annotation of events. The graphical representation is then added to the artificial reality environment.

Figure 6D:
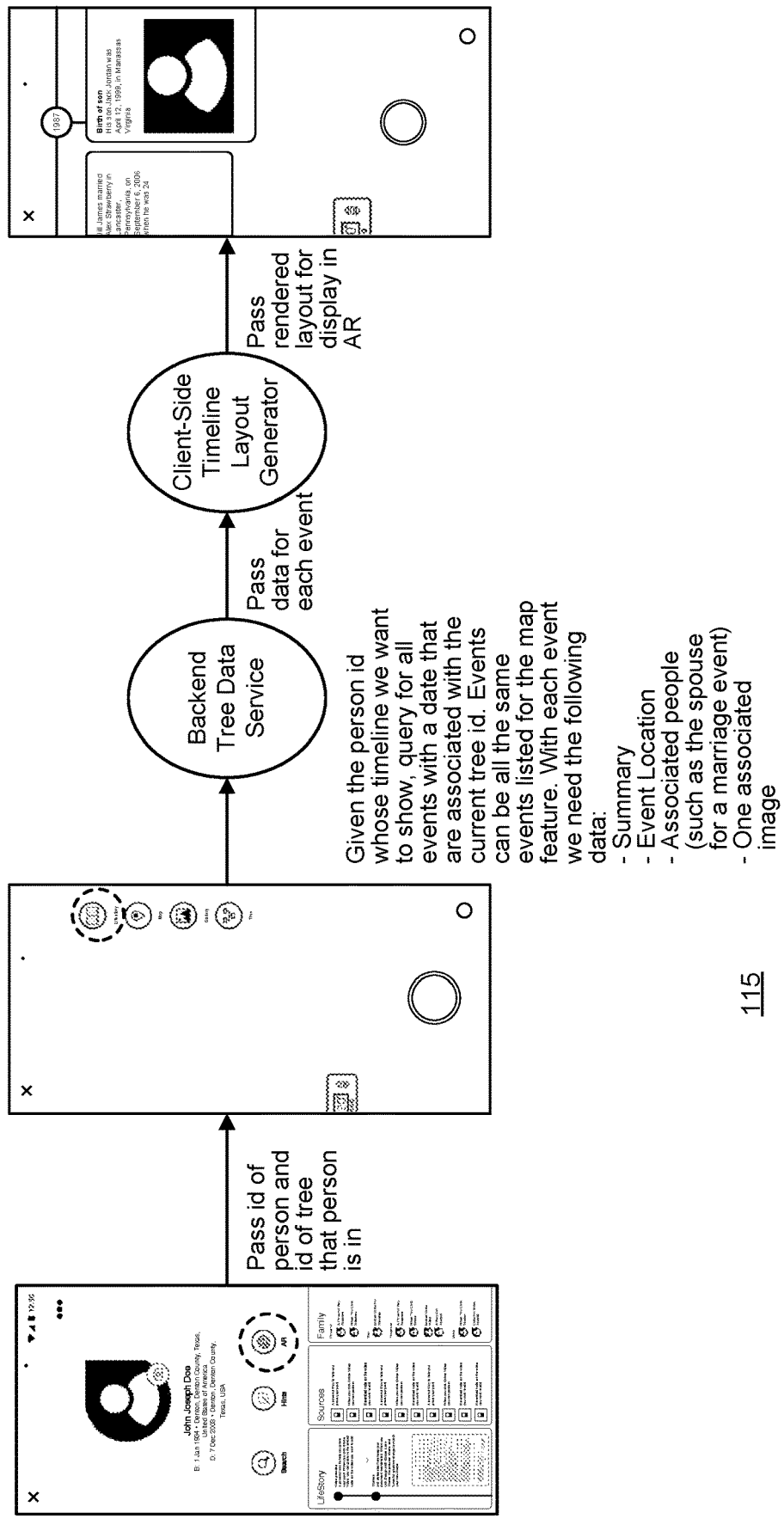
FIG. 6D is a conceptual diagram illustrating a process of using a life story timeline as the genealogy item that is rendered in an artificial reality experience, in accordance with some embodiments.

FIG. 6D is a conceptual diagram illustrating a process of using a life story timeline as the genealogy item that is rendered in an artificial reality experience, in accordance with some embodiments. The process may start with a user interface 115 that is currently displaying a genealogy research page. The user may select an artificial reality mode. In turn, the client device 110 may query the identifier of the person and also use other tools in conducting research such as performing searches for a relevant map. The client device 110 may also query for events with dates that are associated with the person identifier and relevant tree identifier. Events may include birth, residence, religious ceremonies, emigration, marriage, divorce, death, burial, etc. For each event, the client device 110 may query for the summary, event location, event date, associated people (e.g., spouse for a marriage event), and associated images. Record searching may be performed using, in some embodiments, search techniques as described in U.S. Pat. No. 11,500,884, granted Nov. 15, 2022, U.S. Pat. No. 11,416,501, granted Aug. 16, 2022, U.S. Pat. No. 10,896,189, granted Jan. 19, 2021, each of which is hereby incorporated in its entirety by reference. The query may be sent to the backend media service of the computing server 130. A timeline layout generator may be stored in the client device 110. The computing server 130 may provide the data in the timeline and relevant events as a payload to the client device 110. The timeline layout generator in turn renders the graphical representation of the story timeline with annotation of events. The graphical representation is then added to the artificial reality environment.

Figure 6E:
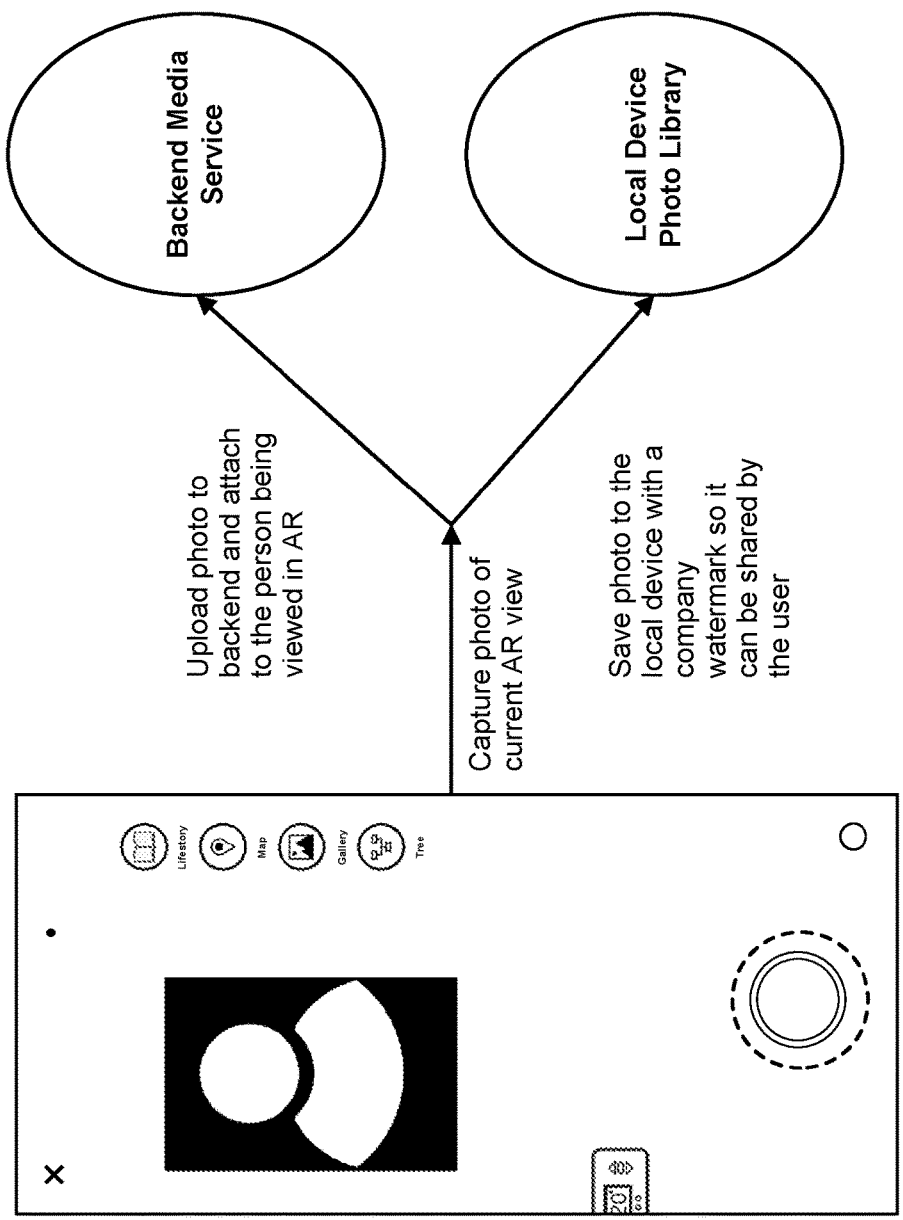
FIG. 6E is a conceptual diagram illustrating a process of outputting captured artificial reality images, in accordance with some embodiments.

FIG. 6E is a conceptual diagram illustrating a process of outputting captured artificial reality images, in accordance with some embodiments. The client device 110 may be used to capture a photo or video of the current artificial reality view. The photo or video may be uploaded to the computing server 130 and attached to a user profile. The photo or video may also be saved to the local device with a company watermark so that the artificial reality photo or video can be shared by the user.

Figure 7A:
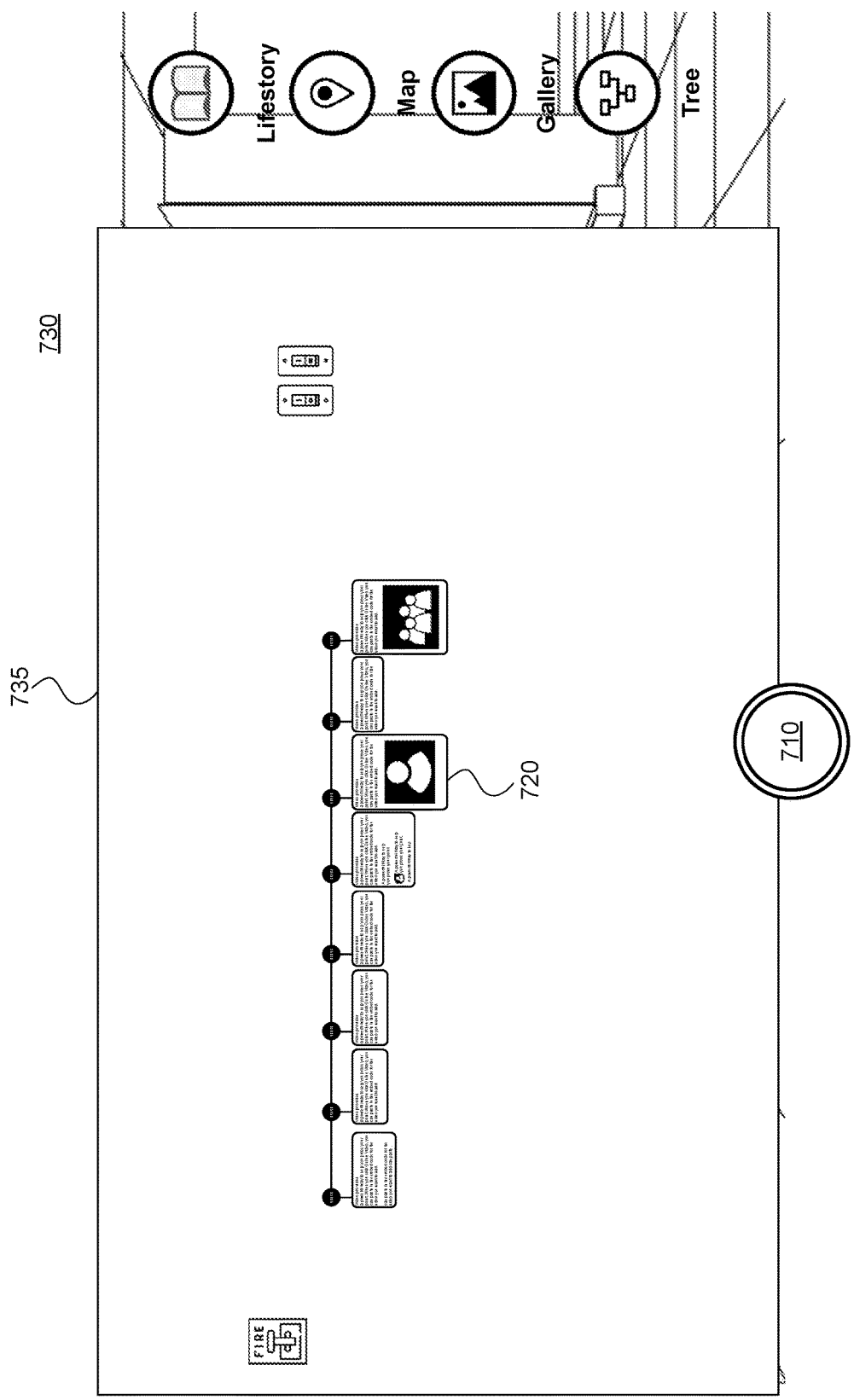
FIG. 7A is an example graphical user interface that presents an artificial reality experience, in accordance with some embodiments.

FIG. 7A is an example graphical user interface that presents an artificial reality experience that includes continually updating images or videos based on the position of a client device 110 while having a story timeline as the graphical representation 720 that is fixed relative to the environment 730, in accordance with some embodiments. The user interface may include a control element 710 that allows the user to capture any image of the artificial reality experience. Once captured, the artificial reality image may be automatically uploaded to the computing server 130 and saved in a user account space associated with the user. The background is a physical wall 735 of a room.

Figure 7B:
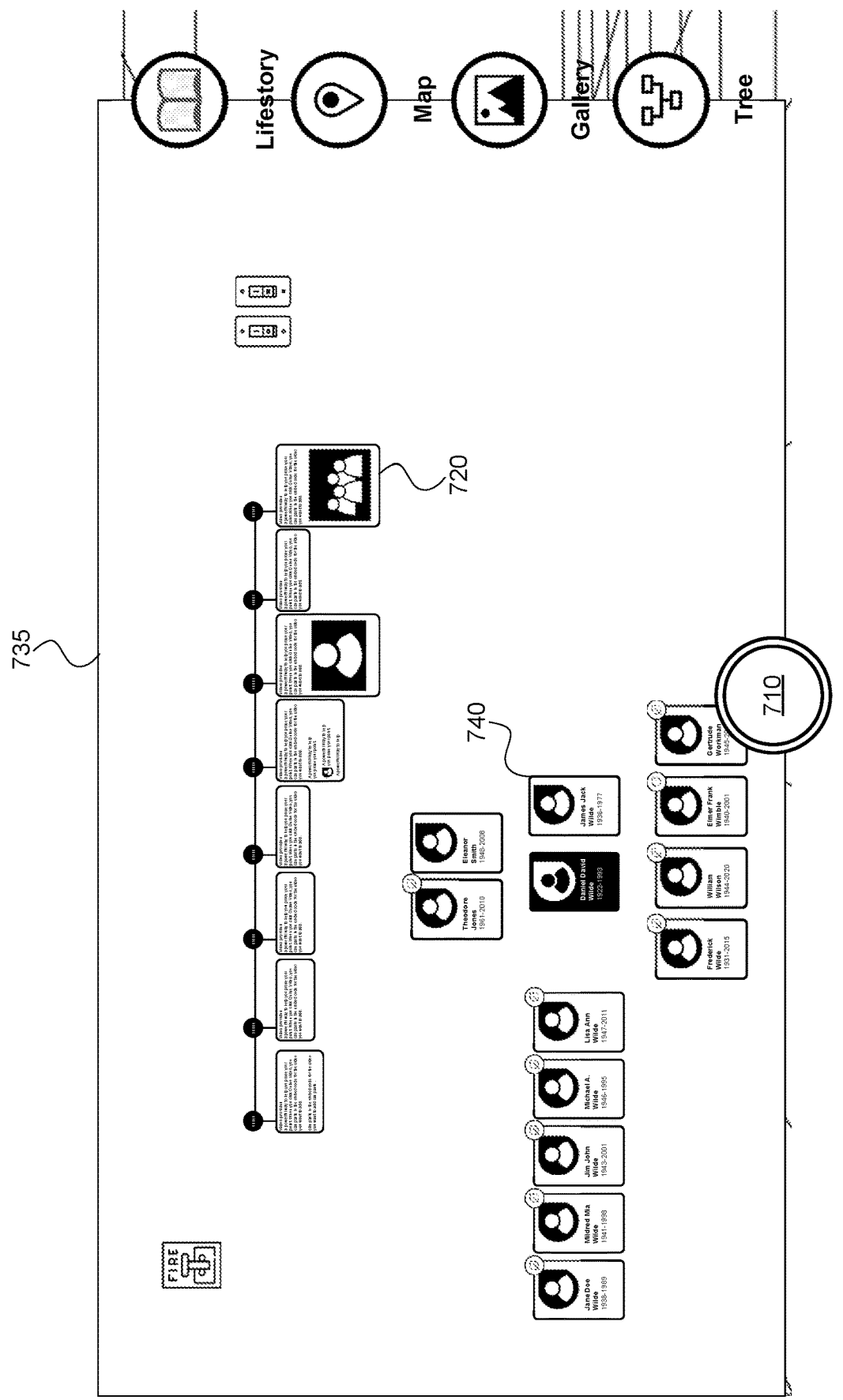
FIG. 7B is an example graphical user interface that presents an artificial reality experience, in accordance with some embodiments.

FIG. 7B is an example graphical user interface that presents an artificial reality experience that includes continually updating images or videos based on the position of a client device 110 while having both a story timeline 720 and a family tree 740 overlaid on a physical wall 735 captured in the physical environment, in accordance with some embodiments. A user can add multiple graphical representations of different types of genealogy items to the artificial reality experience. Each genealogy item may be rendered as a separately movable digital object in the artificial reality experience. The system, method, and/or devices of embodiments of the present disclosure may be configured to detect a user's interactions via the image-capture device with one or more of the genealogy items and adjust a presentation thereof accordingly. For example, the user may, within the environment 730, touch the story timeline 720 to move or change its size, with the system, method, and/or devices of embodiments configured to detect the user's interactions therewith and move or adjust the item accordingly.

Figure 7C:
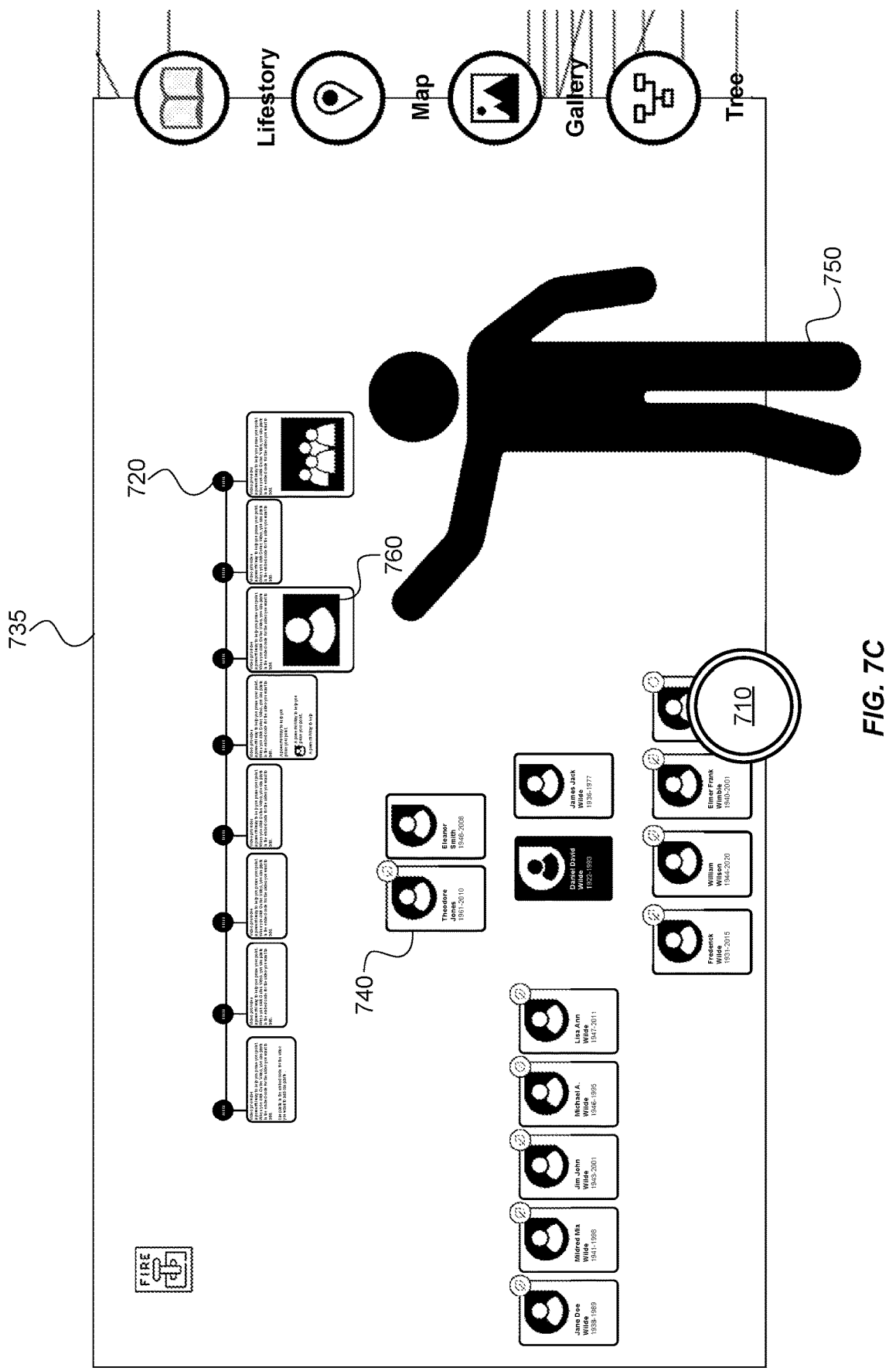
FIG. 7C is an example graphical user interface that presents an artificial reality experience that includes a natural person captured in the experience, in accordance with some embodiments.

FIG. 7C is an example graphical user interface that presents an artificial reality experience that includes a natural person 750 captured in the experience, in accordance with some embodiments. One of the images in the story timeline may be an infant picture 760 of the natural person 750 that is currently in the artificial reality image. This way users may create many personalized images that are linked to their genealogy data.

Figure 7D:
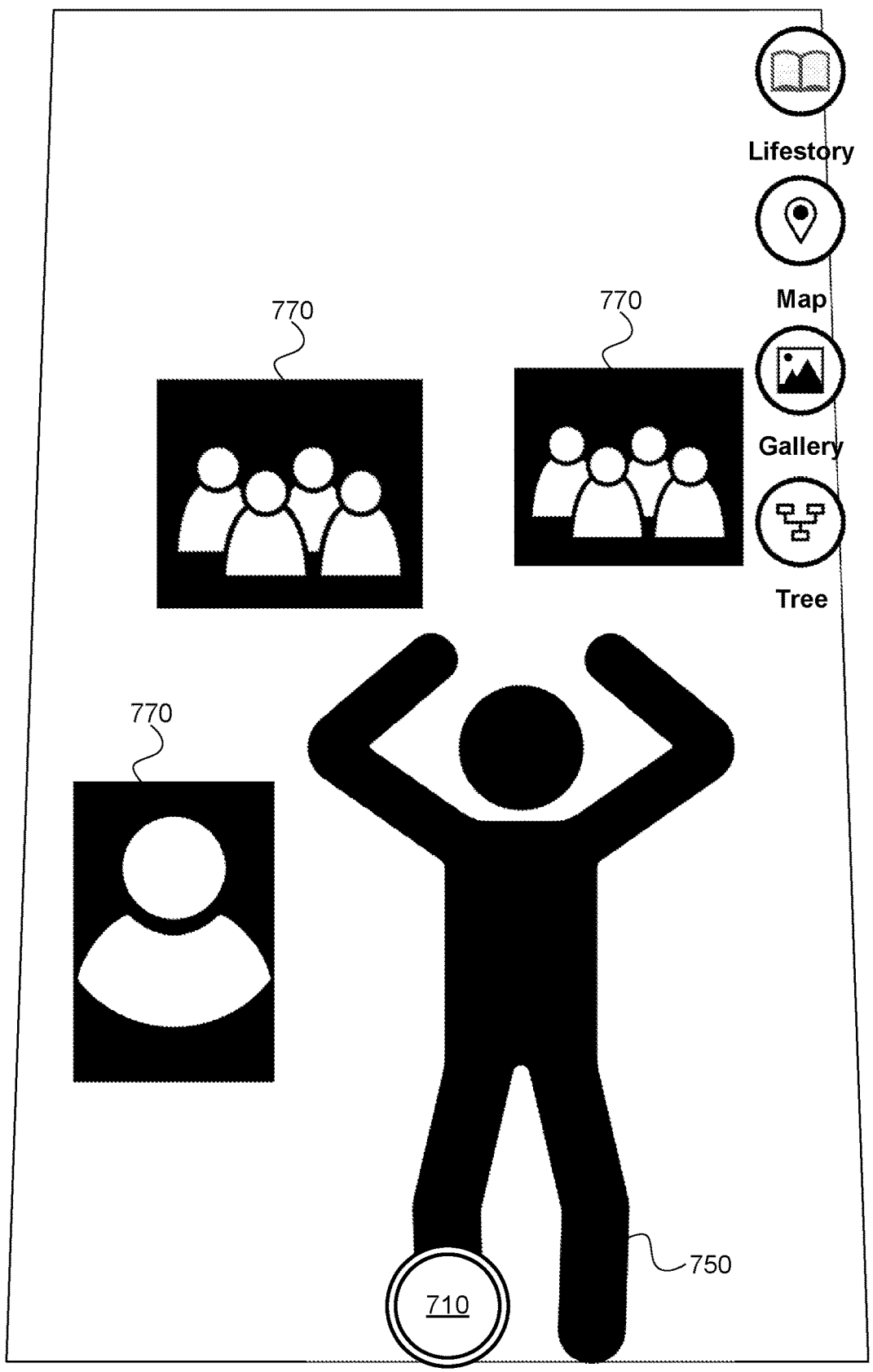
FIG. 7D is an example graphical user interface that presents an artificial reality experience that includes multiple pictures of ancestors of a person placed adjacent to the natural person, in accordance with some embodiments.

FIG. 7D is an example graphical user interface that presents an artificial reality experience that includes multiple pictures 770 of ancestors of a person placed adjacent to the natural person 750, in accordance with some embodiments. The natural person 750 may capture any images of the artificial reality experience to share an experience of personalized genealogy records that are associated with the person that is rendered in a physical environment where the natural person 750 is located.

Figure 7E:
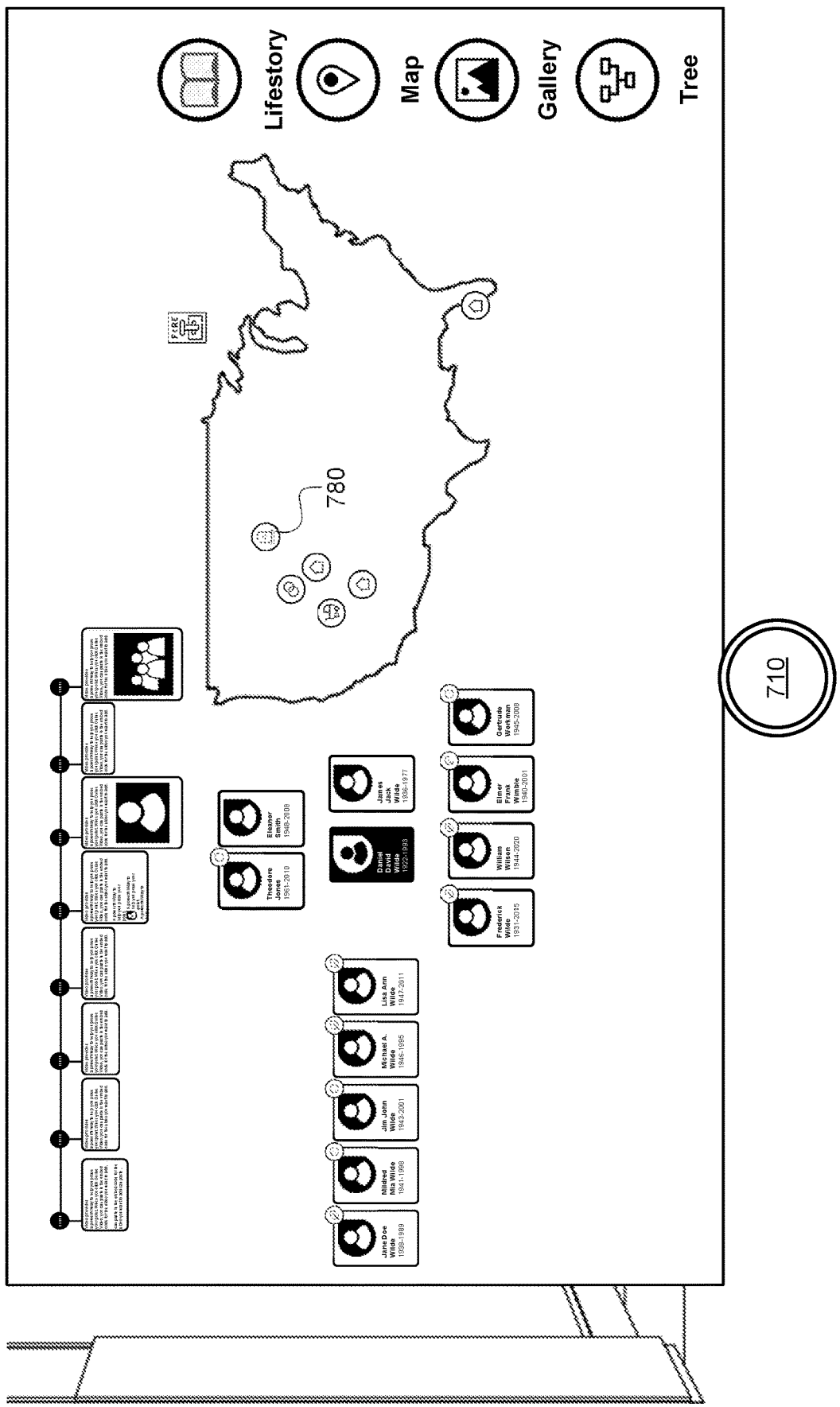
FIG. 7E is an example graphical user interface that presents an artificial reality experience, in accordance with some embodiments.

FIG. 7E is an example graphical user interface that presents an artificial reality experience that includes various different kinds of graphical representations added to the artificial reality environment, in accordance with some embodiments. The map on the right may include multiple interactive elements 780. The interactive element may be selected at the display of the client device 110 (e.g., by a touch screen command) to change one or more things in the graphical representation rendered. For example, the interactive element 780 may cause the map rendered in the artificial reality image to change. In some embodiments, a person in the artificial reality experience may also interact with the interactive element 780. The client device 110 may capture a gesture performed by a person captured in the artificial reality experience. The gesture signals an attempted interaction with the interactive element or with the digital representation of the genealogy item. The system environment 100 may activate the interactive element based on the gesture or adjust (e.g., move, rotate) the digital representation of the genealogy item based on the gesture.

It will be appreciated that the artificial-reality systems, methods, and computer-program products disclosed herein are not limited to maps, family trees, images, and timelines, but rather extend to and cover any suitable feature. For example, in some embodiments an artificial-reality environment may include a rendered family or historical artifact. For example, an important piece of family art, jewelry, clothing, furniture, house, painting, portrait, or other artifact may be rendered three-dimensionally in the artificial-reality environment, thereby allowing descendants who did not physically inherit the artifact or otherwise do not get to regularly interact with the artifact to appreciate and have emotionally engaging experiences therewith. The heirlooms may be scanned, uploaded, and/or stored via any suitable medium or modality, such as Light Detection and Ranging ("LIDAR"). The disclosure, further, is not limited to artifacts but may also extend to locations, such as a building. For example, any suitable modality may be implemented to capture a physical layout such as a house, a school, a historical building, or even an archaeological site so as to allow a user to experience the same in an artificial reality environment. The artificial reality experience may also be used beyond the family history context, and may be applied to any suitable contexts, such as gaming, entertainment, sports, or otherwise.

In some embodiments, a height or estimated height of a historical person (e.g. an ancestor) may be provided and used when displaying a portrait of a person. This may allow a user to stand next to the portrait of the person and take a photo with their ancestor the way that they may have looked standing next to each other. In some embodiments, any suitable image-generation AI model (including generative adversarial networks, variational autoencoders, diffusion models, large language models, autoregressive models, or any other suitable model) may be utilized to generate, from an image, a complete life-sized and scaled image. For example, where a user wishes to "stand next to" their great-grandfather, but only a headshot of their great-grandfather exists in a pertinent image gallery in the system, the system may use any suitable model and any suitable datum (including an estimated height for average men in a particular time period and/or in a particular location or a recorded height for the individual) to scale and/or position the image of the great-grandfather next to the user in the artificial realty environment. In yet further embodiments, the system may "complete" the portrait of the great-grandfather based on the headshot using any suitable AI modality and based on any suitable prompt, including based on standard attire for a time period pertinent to the ancestor. This may allow a user to have a more emotionally engaging experience than would otherwise be possible.

In yet further embodiments, a virtual avatar of any historical person (including ancestors or famous persons, or even synthetic persons such as a generic representative of a time period, event, or family) may be generated using any suitable AI modality. For example, upon instantiating an artificial reality experience, a user may be "guided" or "introduced" to a particular place, such as a historical battlefield, a historical building (like Independence Hall in Philadelphia or the Jefferson Memorial in Washington D.C.) by a suitable AI-generated avatar, such as a generic Union soldier at the Battle of Gettysburg, by Benjamin Franklin, by an ancestor, etc. Such avatars may interact in predefined ways, such as by reading a predefined script, or may be interactive with a user and powered by an AI modality such as a large language model or otherwise.

In some embodiments, avatars or other artificial reality experiences with ancestors or other historical persons may be generated by layering faces and/or animating images of historical persons to allow conversations between a user and a historical person.

In some embodiments, real-time collaboration on family history by disparate researchers may be facilitated. The embodiments may allow users to work simultaneously on a family tree displayed on a wall or other surface and to manipulate the same, allowing disparate researchers to take images together (while apart) with a portrait of an ancestor, to add nodes to a pedigree, or otherwise.

In some embodiments, a map component of an artificial reality environment may include a world or other map that shows a historical person's travels, with chronologically arranged journeys illustrated to users. Thus a user may track, for example, an Italian ancestor's journey from Italy to New York and then from New York to another US location, and then track descendants' journeys. This may allow for an artificial reality experience of a family diaspora. In other embodiments, a world or other map may be populated with all the places visited by certain person(s), allowing a user to experience a breadth of a person or family's exposure to the world. In yet further embodiments, a user may experience one or more artificial reality components of a historical person's life upon selecting the historical person from a record or pedigree node. For example, the user may select an ancestor from the 18$^{th}$ century who lived in a certain location and experience, via the artificial reality environment, one or more aspects of that time and location, including: a historical map experience, allowing the user to "traverse" the streets of that user's hometown, observe the stars as they appeared in that place and time, and otherwise experience records, images, and videos that are common to that place and time (even if not specific to that historical person) for an emotionally engaging contextual introduction.

Computing Machine Architecture

Figure 8:
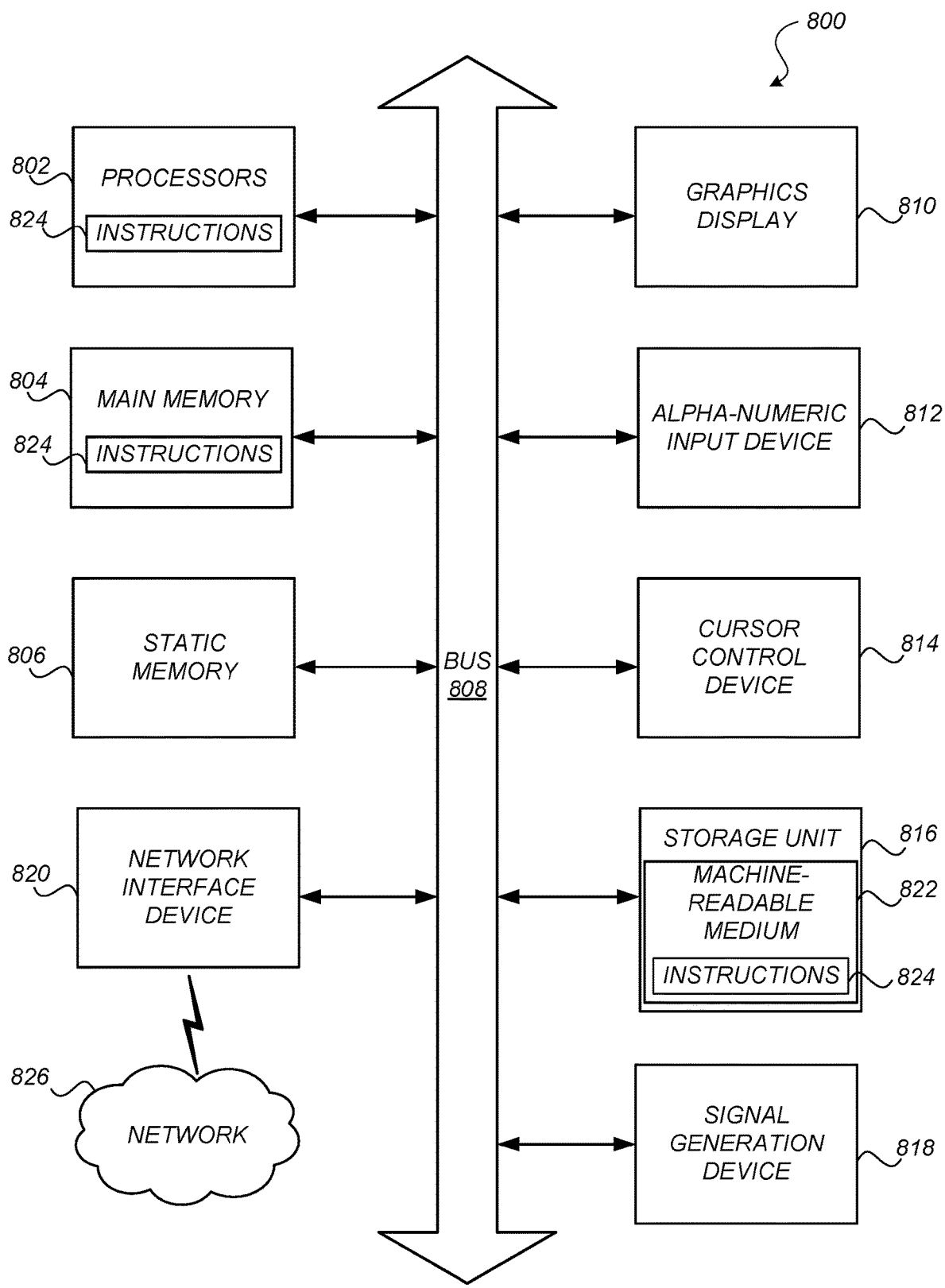
FIG. 8 is a block diagram of an example computing device, in accordance with some embodiments.

FIG. 8 is a block diagram illustrating components of an example computing machine that is capable of reading instructions from a computer-readable medium and executing them in a processor (or controller). A computer described herein may include a single computing machine shown in FIG. 8, a virtual machine, a distributed computing system that includes multiple nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1, 2, and 3 including but not limited to, the client device 110, the computing server 130, and various engines, interfaces, terminals, components, and machines shown in FIG. 2 and FIG. 3. While FIG. 8 shows various hardware and software elements, each of the components described in FIGS. 1, 2, and 3 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the terms "machine" and "computer" may also be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 may also include a memory 804 that stores computer code including instructions 824 that may cause the processor 802 to perform certain actions when the instructions are executed, directly or indirectly by the processor 802. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 802 and reduce the space required for the memory 804. For example, the database processing techniques and machine learning methods described herein reduce the complexity of the computation of the processors 802 by applying one or more novel techniques that simplify the steps in rendering digital representation in an artificial reality experience. The algorithms described herein also reduce the size of the digital representation to reduce the storage space requirement for memory 804.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processor 802, displays a graphical user interface (GUI) to display one or more results and data generated by the processes described herein. The computer system 800 may also include an alphanumeric input device 812 (e.g., a keyboard), a cursor control device 814 (e.g., a mouse, a trackball, a joystick, a motion sensor, or other pointing instruments), a storage unit 816 (a hard drive, a solid-state drive, a hybrid drive, a memory disk, etc.), a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the processors (e.g., processors 802) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, or storage medium, as well. The dependencies or references in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that are issued on an application based hereon. Accordingly, the disclosure of the embodiments is intended to be illustrative, but not limited, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558, 930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A system comprising:
a genealogy server comprising memory and one or more processors, the memory configured to store code comprising instructions, the instructions, when executed by the one or more processors, cause the one or more processors to:
store genealogy data and a plurality of user profiles; and
provide a genealogy research platform for users to view the genealogy data; and
a client device remote from the genealogy server and in communication with the genealogy server, the client device comprising an image sensor and a display, the client device configured to:
display the genealogy research platform that is in communication with the genealogy server;
receive a command from a user selecting a genealogy item to launch an artificial reality experience;
present, at the display and responsive to the command, continually updating images of an environment in the artificial reality experience; and
render a digital representation of the genealogy item in the artificial reality experience, the digital representation of the genealogy item overlaid on the continually updating images of the environment.

2. The system of claim 1, wherein the client device is further configured to:
receive a command to capture an artificial reality image; and
transmit the artificial reality image to the genealogy server for storage of the artificial reality image in a user account space associated with the user.

3. The system of claim 1, wherein the artificial reality experience further comprises an interactive element, the interactive element selectable at the display to change one or more things in the digital representation rendered.

4. The system of claim 1, wherein the client device is further configured to:
capture a gesture performed by a person captured in the artificial reality experience, the gesture signaling an attempted interaction; and
adjust the digital representation based on the gesture.

5. The system of claim 1, wherein the digital representation of the genealogy item includes a family tree.

6. The system of claim 1, wherein the command to launch the artificial reality experience comprises a request to scan an encoded marker to identify the artificial reality experience that is previously created.

7. The system of claim 1, wherein the environment is a physical area captured by the image sensor of the client device, and wherein a position of the digital representation in the artificial reality experience is fixed relative to the physical area.

8. The system of claim 1, wherein rendering the digital representation of the genealogy item in the artificial reality experience comprises:
present the digital representation of the genealogy item;
receive a gesture command from the user, the gesture command indicating a drag action to drag the digital representation from a first location to a second location in the continually updating images; and
present a continuous movement of the digital representation until a position of the digital representation is fixed in the artificial reality experience.

9. The system of claim 1, wherein the artificial reality experience is an augmented reality experience that captures a physical environment, and the digital representation of the genealogy item is overlaid on an object in the physical environment.

10. The system of claim 1, wherein the client device is configured to render additional one or more digital representations of additional genealogy items in the artificial reality experience.

11. A computer-implemented method, comprising:
displaying, at a client device remote from a genealogy server and in communication with the genealogy server, a genealogy research platform that is in communication with the genealogy server, the genealogy server storing genealogy data and a plurality of user profiles;
receive a command from a user selecting a genealogy item to launch an artificial reality experience;
present, at a display of the client device and responsive to the command, continually updating images of an environment in the artificial reality experience; and
render a digital representation of the genealogy item in the artificial reality experience, the digital representation of the genealogy item overlaid on the continually updating images of the environment.

12. The computer-implemented method of claim 11, further comprising:
receiving a command to capture an artificial reality image; and
transmitting the artificial reality image to the genealogy server for storage of the artificial reality image in a user account space associated with the user.

13. The computer-implemented method of claim 11, wherein the artificial reality experience further comprises an interactive element, the interactive element selectable at the display to change one or more things in the digital representation rendered.

14. The computer-implemented method of claim 11, further comprising:
capturing a gesture performed by a person captured in the artificial reality experience, the gesture signaling an attempted interaction; and
adjusting the digital representation based on the gesture.

15. The computer-implemented method of claim 11, wherein the digital representation of the genealogy item includes a family tree.

16. The computer-implemented method of claim 11, wherein the command to launch the artificial reality experience comprises a request to scan an encoded marker to identify the artificial reality experience that is previously created.

17. An artificial reality device, comprising:
an image sensor configured to capture an environment;
a display configured to display a genealogy research platform that is in communication with a genealogy server that is in communication with the artificial reality device; and
a processor configured to execute one or more instructions, the instructions causing the processor to:
receive a command from a user selecting a genealogy item to launch an artificial reality experience;
cause, responsive to the command, the display to present continually updating images of an environment in the artificial reality experience; and
render a digital representation of the genealogy item in the artificial reality experience, the digital representation of the genealogy item overlaid on the continually updating images of the environment.

18. The artificial reality device of claim 17, wherein the artificial reality experience is an augmented reality experience that captures a physical environment, and the digital representation of the genealogy item is overlaid on an object in the physical environment.

19. The artificial reality device of claim 17, wherein the command to launch the artificial reality experience comprises a request to scan an encoded marker to identify the artificial reality experience that is previously created.

20. The artificial reality device of claim 17, wherein the artificial reality experience further comprises an interactive element, the interactive element selectable at the display to change one or more things in the digital representation rendered.

* * * * *